(12) United States Patent
Meckel et al.

(10) Patent No.: US 12,427,429 B2
(45) Date of Patent: *Sep. 30, 2025

(54) SYSTEM AND METHOD FOR MATCHING USERS OF CLIENT APPLICATIONS

(71) Applicant: Skillz Platform Inc., San Francisco, CA (US)

(72) Inventors: Andrew Reynolds Meckel, San Francisco, CA (US); Matthew Palmer, Los Angeles, CA (US); Samuel York Baker, San Francisco, CA (US); Scott M. Halladin, Portland, OR (US); Kevin Babb, Oakland, CA (US); Scott L. Gregoire, Portland, OR (US)

(73) Assignee: Skillz Platform, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,394

(22) Filed: Jun. 26, 2024

(65) Prior Publication Data

US 2024/0342618 A1 Oct. 17, 2024

Related U.S. Application Data

(63) Continuation of application No. 18/331,445, filed on Jun. 8, 2023, now Pat. No. 12,053,705, which is a (Continued)

(51) Int. Cl.
*A63F 13/795* (2014.01)
*A63F 13/798* (2014.01)

(52) U.S. Cl.
CPC .......... *A63F 13/795* (2014.09); *A63F 13/798* (2014.09); *A63F 2300/5566* (2013.01); *A63F 2300/558* (2013.01)

(58) Field of Classification Search
CPC ................. A63F 13/795; A63F 13/798; A63F 2300/558; A63F 2300/5566
See application file for complete search history.

(56) References Cited

U.S. PATENT DOCUMENTS 10,398,986 B1 9/2019 Henroid
11,712,631 B2 8/2023 Meckel et al.
(Continued)

FOREIGN PATENT DOCUMENTS

WO 2022241469 A1 11/2022

*Primary Examiner* — David L Lewis
*Assistant Examiner* — Shauna-Kay Hall
(74) *Attorney, Agent, or Firm* — Mintz Levin Cohn Ferris Glovsky and Popeo, P.C.

(57) ABSTRACT

In an aspect, a request, from a first user of a plurality of users of an application client executing on respective mobile devices of the plurality of users, to interact with one or more other users of the plurality of users in the application client, based on a first plurality of interaction templates selected by the first user, can be received. A second user associated with a second interaction template can be determined from the plurality of users, and the determination can be based on an identification of a match between the second interaction template and a first interaction template from the first plurality of interaction templates. Interaction in the application client, between the first user and the second user, can be initiated in response to the determination of the second user. Related systems, apparatus, techniques, and articles are also described.

20 Claims, 8 Drawing Sheets

Related U.S. Application Data continuation of application No. 17/663,337, filed on May 13, 2022, now Pat. No. 11,712,631.

(60) Provisional application No. 63/269,843, filed on Mar. 24, 2022, provisional application No. 63/188,004, filed on May 13, 2021.

(56) References Cited

U.S. PATENT DOCUMENTS

| | | |
|---|---|---|
| 12,053,705 B2 | 8/2024 | Meckel et al. |
| 2004/0127289 A1 | 7/2004 | Davis et al. |
| 2006/0121990 A1 | 6/2006 | Okelley et al. |
| 2007/0191102 A1 | 8/2007 | Coliz et al. |
| 2008/0045335 A1* | 2/2008 | Garbow ............... H04L 67/306 463/29 |
| 2009/0035209 A1* | 2/2009 | Kondo ................... B82Y 30/00 977/843 |
| 2009/0047982 A1* | 2/2009 | Shi ........................ A63F 13/327 455/466 |
| 2011/0306426 A1 | 12/2011 | Novak et al. |
| 2013/0331192 A1 | 12/2013 | Betti et al. |
| 2014/0025732 A1* | 1/2014 | Lin ....................... A63F 13/795 709/204 |
| 2014/0171182 A1 | 6/2014 | Versaci |
| 2015/0038233 A1 | 2/2015 | Rom et al. |
| 2016/0027260 A1 | 1/2016 | Pierce et al. |
| 2017/0252653 A1* | 9/2017 | Kada ................... A63F 13/795 |
| 2019/0035209 A1 | 1/2019 | Simons et al. |
| 2020/0023277 A1* | 1/2020 | Chow ................... A63F 13/798 |
| 2022/0362679 A1 | 11/2022 | Meckel et al. |
| 2023/0347250 A1 | 11/2023 | Meckel et al. |

\* cited by examiner

600

```
┌─────────────────────────────────────────────────────────────────────────┐
│ RECEIVE A REQUEST, FROM A FIRST USER OF A PLURALITY OF USERS OF AN      │── 605
│ APPLICATION CLIENT EXECUTING ON RESPECTIVE MOBILE DEVICES OF THE        │
│ PLURALITY OF USERS, TO INTERACT WITH ONE OR MORE OTHER USERS OF THE     │
│ PLURALITY OF USERS IN THE APPLICATION CLIENT BASED ON A FIRST PLURALITY │
│ OF INTERACTION TEMPLATES SELECTED BY THE FIRST USER                     │
└─────────────────────────────────────────────────────────────────────────┘
                                    │
                                    ▼
┌─────────────────────────────────────────────────────────────────────────┐
│ DETERMINING A SECOND USER FROM THE PLURALITY OF USERS, THE SECOND USER  │── 610
│ ASSOCIATED WITH A SECOND INTERACTION TEMPLATE, THE DETERMINING BASED    │
│ ON AN IDENTIFICATION OF A MATCH BETWEEN THE SECOND INTERACTION TEMPLATE │
│ AND A FIRST INTERACTION TEMPLATE FROM THE FIRST PLURALITY OF            │
│ INTERACTION TEMPLATES                                                   │
└─────────────────────────────────────────────────────────────────────────┘
                                    │
                                    ▼
┌─────────────────────────────────────────────────────────────────────────┐
│ INITIATE INTERACTION BETWEEN THE FIRST USER AND THE SECOND USER IN THE  │── 615
│ APPLICATION CLIENT IN RESPONSE TO THE DETERMINATION OF THE SECOND USER  │
└─────────────────────────────────────────────────────────────────────────┘
```

FIG. 6

SYSTEM AND METHOD FOR MATCHING USERS OF CLIENT APPLICATIONS

CROSS-REFERENCE TO RELATED APPLICATIONS

This application is a continuation of U.S. application Ser. No. 18/331,445, filed Jun. 8, 2023, which claims benefit of U.S. application Ser. No. 17/663,337, filed May 13, 2022, which claims the benefit of U.S. Provisional Application No. 63/188,004, filed May 13, 2021, and U.S. Provisional Application No. 63/269,843, filed Mar. 24, 2022, the contents of each of which are hereby incorporated by reference in their entirety.

BACKGROUND OF THE INVENTION

Users of client applications can engage or otherwise interact with other users of those client applications in a variety of ways. For example, users can compete against other users in client applications (e.g., mobile games or other computer games) to win prizes or other achievements. One of the factors that can affect a user's experience in a client application is the quality of the opponent against whom the user is competing or otherwise interacting. A large disparity between opponents, such as in their respective ability or skill levels, can adversely affect each user's experience in the client application. For example, if a beginner is paired against an expert in a competition, neither the beginner nor the expert may find the competition interesting or even fair, as the beginner may become frustrated at having little to no chance of winning while the expert may become frustrated by competing against an opponent that offers little to no challenge. Another factor that can affect a user's experience in a client application is the time taken to find an opponent. Longer wait times can frustrate users, which can lead to churn.

SUMMARY OF THE INVENTION

Systems and methods for matching users of client applications are provided. Related apparatus, techniques, and articles are also described.

In an aspect, a request, from a first user of a plurality of users of an application client executing on respective mobile devices of the plurality of users, to interact with one or more other users of the plurality of users in the application client, based on a first plurality of interaction templates selected by the first user, can be received. A second user associated with a second interaction template can be determined from the plurality of users, and the determination can be based on an identification of a match between the second interaction template and a first interaction template from the first plurality of interaction templates. Interaction in the application client, between the first user and the second user, can be initiated in response to the determination of the second user.

One or more of the following features can be included in any feasible combination. For example, the second user can be searched for until a match between another interaction template from the first plurality of interaction templates and the second interaction template is identified. For example, the second interaction template and each of the first plurality of interaction templates can characterize a synchronous electronic tournament for enrollment by the first user and the second user. For example, the determination of the second user can further include the selection of the first interaction template from the first plurality of interaction templates based on an operating parameter of the synchronous electronic tournament. For example, the determination of the second user can further include the selection of the first interaction template from the first plurality of interaction templates based on a determined priority of the first interaction template. For example, a third user from the plurality of users associated with a fourth interaction template that matches a third interaction template from the first plurality of interaction templates can be determined, and the determination of the third user can occur when a length of time for the determination of the second user exceeds a predetermined threshold. For example, a graphical prompt, for display on the mobile device of the first user, can be determined, and the graphical prompt can characterize instructions to select a fifth interaction template from the first plurality of interaction templates when a length of time for the determination of the second user exceeds a predetermined threshold. For example, in response to the selection of the fifth interaction template, a fourth user from the plurality of users associated with a sixth interaction template that matches the fifth interaction template can be determined. For example, the first plurality of interaction templates can be selected by the first user from a set of available interaction templates, and the set of available interaction templates can be determined based on a characteristic of the first user. For example, the determination of the second user can be based on a characteristic of the first user. For example, the determination of the second user can be based on a characteristic of one or more of the first plurality of interaction templates.

In another aspect, a system is provided and can include at least one data processor and memory storing instructions configured to cause the at least one data processor to perform operations described herein. The operations can include receiving a request, from a first user of a plurality of users of an application client executing on respective mobile devices of the plurality of users, to interact with one or more other users of the plurality of users in the application client based on a first plurality of interaction templates selected by the first user; determining a second user from the plurality of users, the second user associated with a second interaction template, the determining based on an identification of a match between the second interaction template and a first interaction template from the first plurality of interaction templates; and initiating interaction between the first user and the second user in the application client in response to the determination of the second user.

One or more of the following features can be included in any feasible combination. For example, the operations can further include searching for the second user until a match between another interaction template from the first plurality of interaction templates and the second interaction template is identified. For example, the second interaction template and each of the first plurality of interaction templates can characterize a synchronous electronic tournament for enrollment by the first user and the second user. For example, the determining can further include selecting the first interaction template from the first plurality of interaction templates based on an operating parameter of the synchronous electronic tournament. For example, the determining can further include selecting the first interaction template from the first plurality of interaction templates based on a determined priority of the first interaction template. For example, the operations can further include determining a third user from the plurality of users associated with a fourth interaction template that matches a third interaction template from the first plurality of interaction templates, the determining of the third user occurring when a length of time for the determination of the second user exceeds a predetermined threshold. For example, the operations can further include determining a graphical prompt, for display on the mobile device of the first user, characterizing instructions to select a fifth interaction template from the first plurality of interaction templates when a length of time for the determination of the second user exceeds a predetermined threshold; and in response to the selection of the fifth interaction template, determining a fourth user from the plurality of users associated with a sixth interaction template that matches the fifth interaction template. For example, the first plurality of interaction templates can be selected by the first user from a set of available interaction templates, and the set of available interaction templates can be determined based on a characteristic of the first user. For example, the determining of the second user can be based on a characteristic of the first user.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

BRIEF DESCRIPTION OF THE DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 6 is a block diagram illustrating an example computer-implemented method of automatically determining an appropriate match for a user of a client application based on a plurality of interaction templates selected by the user.

DESCRIPTION OF THE INVENTION

Figure 1:
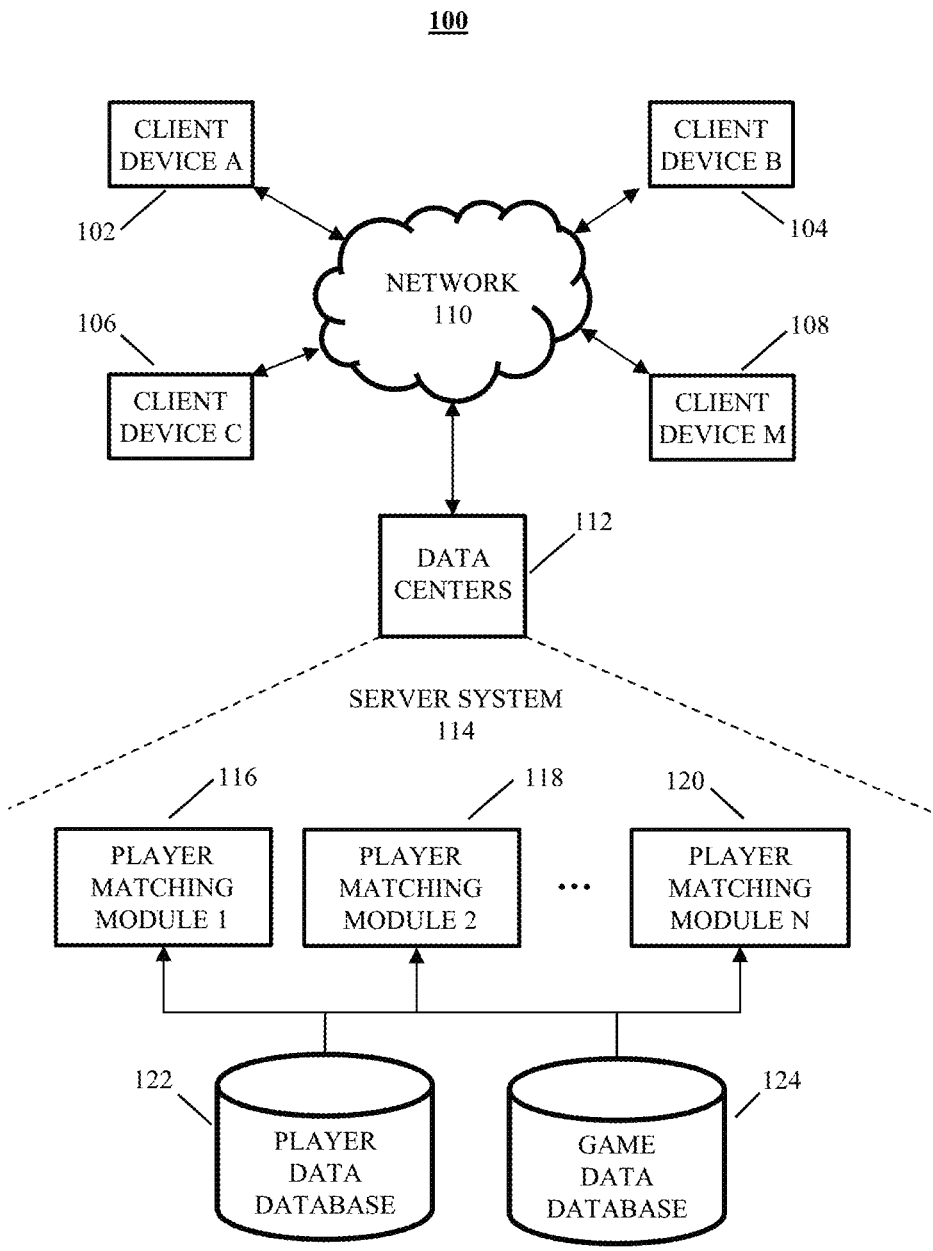
FIG. 1 is a block diagram illustrating an example system for automatically determining an appropriate match for a user of a mobile game.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Some implementations of the system and method of the present invention are directed to automatically matching users in a client application with other users of that client application. The present invention can use one or more of a variety of user matching modules to automatically choose the most appropriate match for each user based on characteristics of the users. For example, the present invention can automatically match an individual user of the client application with another individual user of the client application based on one or more characteristics that are similar between the two users. Additionally or alternatively, some implementations of the present invention can match a first user or first group of users (e.g., a first cohort of a plurality of cohorts) that collectively share one or more characteristics with a second group of users that collectively share one or more characteristics that are similar to the first user or first group of users. Some implementations of the present invention can also match users more quickly by allowing users to enter queues for multiple templates with multiple modes of the client application. Some implementations of the present invention can match users more quickly by allowing users to enter queues for multiple templates with multiple modes of the client application. Additionally, some implementations of the present invention can improve the efficiency and processing capabilities of computer hardware resources (e.g., computer processing and memory) to identify matches by supporting and providing substantially faster matching times, particularly for client applications with large numbers of users (e.g., hundreds of thousands, millions, tens of millions, etc. of users). For example, some implementations of the present invention can more efficiently handle large numbers of users enqueuing and identifying matches in a plurality of templates at the same time. By improving the matching speed and efficiency for client applications with large numbers of users, computer hardware resources can be freed up more quickly and used for other tasks and processes, resulting in a significant improvement in computer resource utilization.

Merely for purposes of discussion and not limitation, the present disclosure will refer to mobile games as an exemplary client application to illustrate various aspects of the present invention. However, some implementations of the present invention can be used in and with any suitable type of client application in which one or more users are automatically matched against one or more other users to engage or otherwise interact with for the purpose of achieving some goal or result within the client application. For example, the present invention can generate matches for a competition or tournament or other appropriate activity or to otherwise match users with certain characteristics with other users of the client application that have similar characteristics (e.g., to establish chat or social connections within the client application).

FIG. 1 is a block diagram illustrating an example system 100 for automatically determining an appropriate match for a user of a mobile game. A server system 114 can provide functionality for collecting data associated with characteristics of players in a mobile game. The server system 114 can include software components and databases that can be deployed at one or more data centers 112 in, for example, one or more geographic locations. The software components of the server system 112 can include a plurality of player matching modules, including a first player matching module 116, a second player matching module 118, . . . , an $N^{th}$ player matching module 120, where N can be any suitable natural number. The software components can include sub-components that can execute on the same or on different individual data processing apparatus. The databases of the server system 114 can include, for example, a player data database 122 and a game data database 124, although other databases are possible. The databases can reside in one or more physical storage systems or be cloud-based. The software components and data will be further described below.

As illustrated in FIG. 1, the first player matching module 116, the second player matching module 118, . . . , the $N^{th}$ player matching module 120 can communicate with the player data database 122 and the game data database 124. The player data database 120 can include, for example, any suitable information related to characteristics of one or more players of mobile games and the interactions between those players and the mobile games, such as, for example, player game history (e.g., which mobile games were played, number of games won in each mobile game, number of games lost in each mobile game, number of games played for each mobile game, scores in each mobile game, time played for each mobile game, win/loss percentages, etc.), player identifying information (e.g., usernames), a history of player connections to the system 100, player purchases, player accomplishments, player tasks, player interactions with other users (e.g., chats), player purchases, player deposits/withdrawals, player virtual item acquisition or usage, other conditions in the mobile games, and other like player characteristics and/or information. The game data database 124 can include, for example, information related to the mobile games implemented using the system 100. The game data database 124 can include information related to each mobile game, such as, for example, a virtual environment for each mobile game, image, video and/or audio data for each mobile game, event data corresponding to previous, current or future events, game state data defining a current state of each mobile game, and/or the like.

A software application, such as, for example, a mobile game or other web-based or suitable client application, can be provided as an end-user client application to allow users to interact with the server system 114. The software application can relate to and/or provide a wide variety of functions and information, including, for example, entertainment (e.g., a game, music, videos, etc.), business (e.g., word processing, accounting, spreadsheets, etc.), news, weather, finance, sports, etc. In certain embodiments, the software application can provide a mobile game. The mobile game can be or include, for example, a sports game, an adventure game, a virtual playing card game, a virtual board game, a puzzle game, a racing game, or any other appropriate type of mobile game. In an embodiment, the mobile game can be an asynchronous competitive skill-based game, in which players can compete each against other in the mobile game, but do not have to play the mobile game at the same time. In an alternative embodiment, the mobile game can be a synchronous competitive skill-based game, in which players can play the mobile game at the same time and can compete against each other in the mobile game in real-time. Other suitable mobile games are possible.

The software application or components thereof can be accessed through a network 110 (e.g., the Internet) by users of client devices, such as client device A 102, client device B 104, client device C 106, . . . , client device M 108, where M can be any suitable natural number. Each of the client devices can be any appropriate type of electronic device that is capable of executing the software application and communicating with the server system 114 through the network 110, such as, for example, a smart phone, a tablet computer, a laptop computer, a desktop or personal computer, or the like. Other client devices are possible (e.g., game consoles and other like computing devices). In an alternative embodiment, the player data database 122, the game data database 124, or any portions thereof can be stored on one or more client devices. Additionally or alternatively, software components for the system 100 (e.g., the first player matching module 116, the second player matching module 118, . . . , the $N^{th}$ player matching module 120) or any portions thereof can reside on or be used to perform operations on one or more client devices.

Figure 2A:
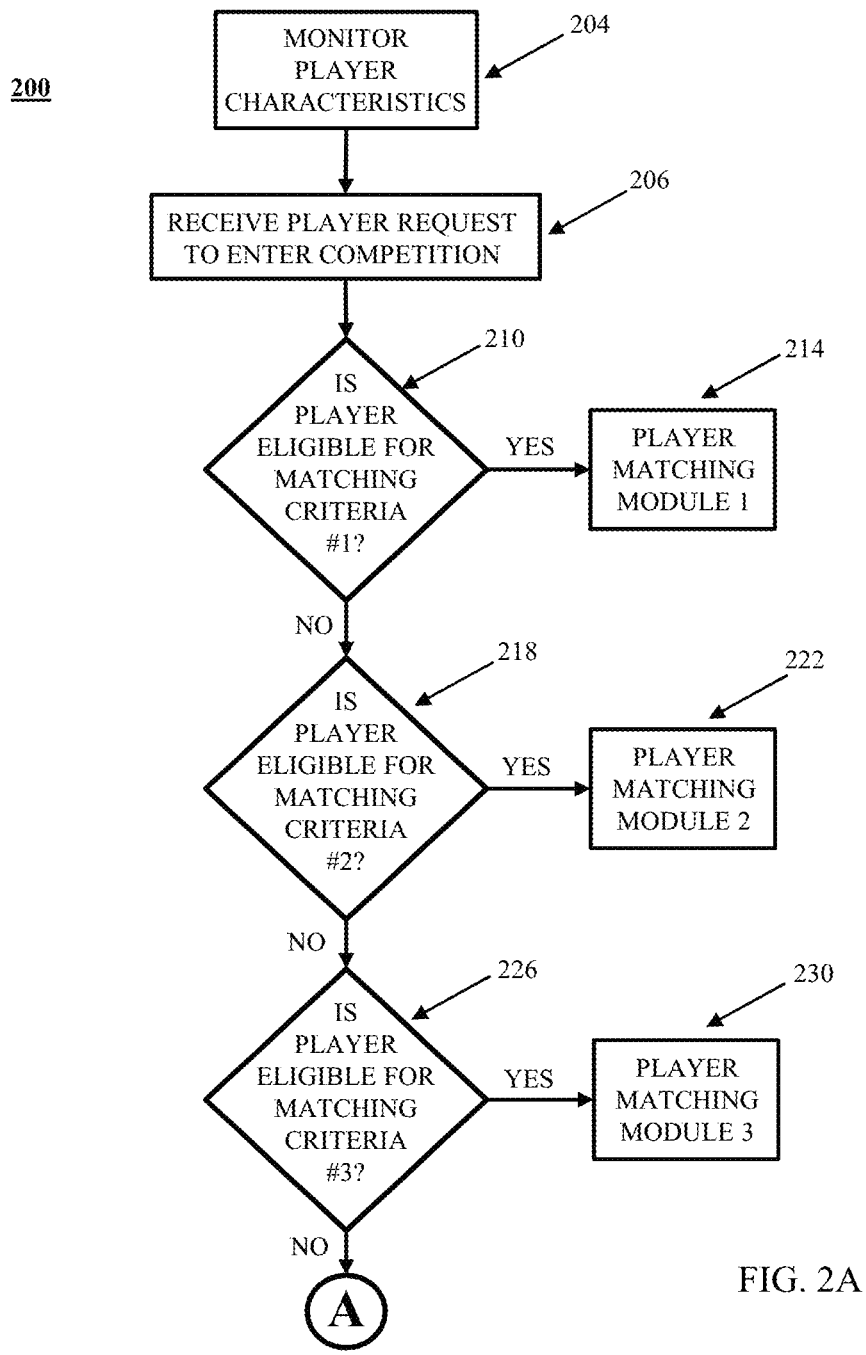
FIGS. 2A and 2B are block diagrams illustrating an example computer-implemented method of automatically determining an appropriate match for a user of a mobile game.
Figure 2B:
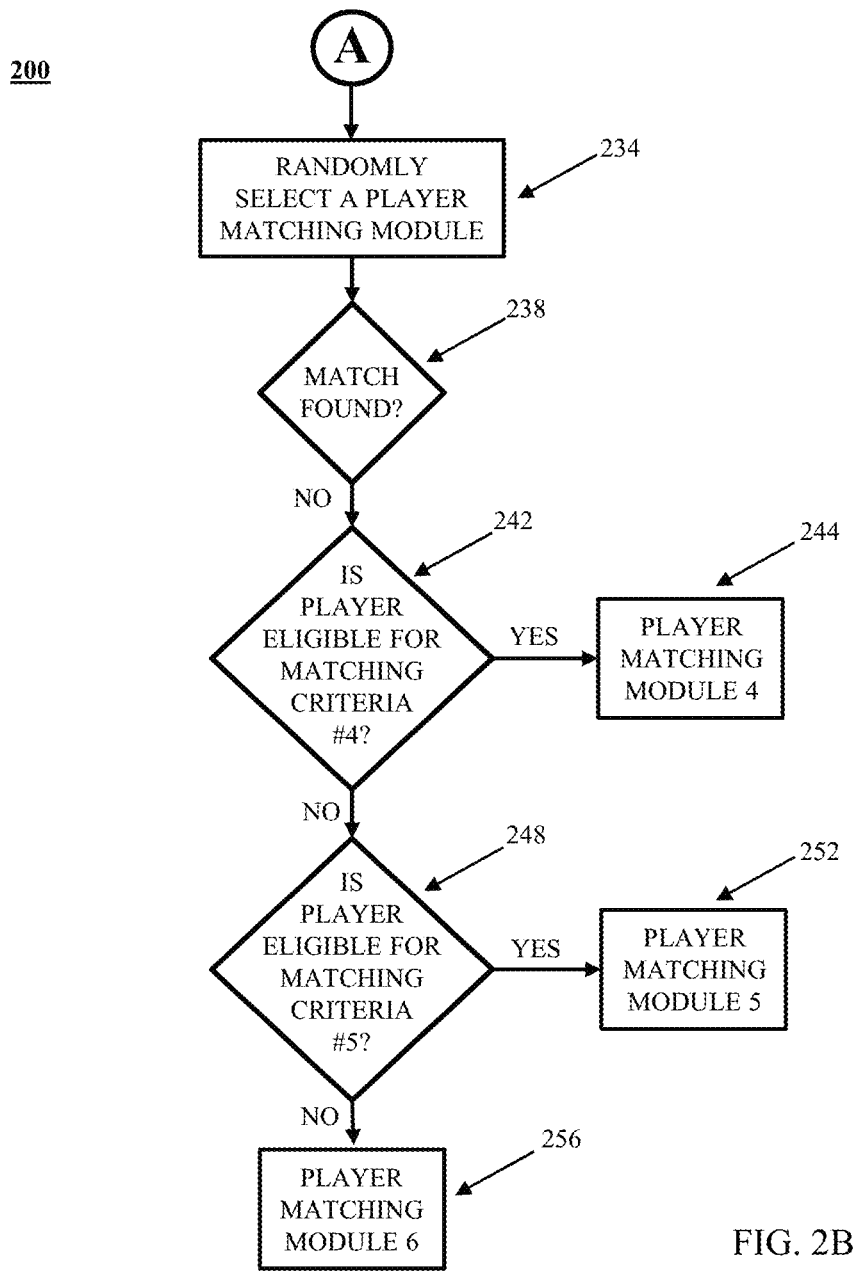

FIGS. 2A and 2B are block diagrams illustrating an example computer-implemented method 200 of automatically determining an appropriate match for a user of a mobile game, in accordance with embodiments of the disclosure. In general, the method 200 can be performed by processing logic (e.g., of server system 114) that may include hardware (e.g., processing device, circuitry, dedicated logic, programmable logic, microcode, hardware of a device, integrated circuit, etc.), software (e.g., instructions run or executed on a processing device), or a combination thereof. In an embodiment, the method 200 can be performed by the processing logic in conjunction with any or all of the first player matching module 116, the second player matching module 118, . . . , the $N^{th}$ player matching module 120 illustrated in and discussed with respect to FIG. 1. Method 200 can begin at block 204, where the processing logic can monitor one or more characteristics of each player in a mobile game that is played on a respective client device (e.g., client device A 102, client device B 104, client device C 106, . . . , client device M 108). The player characteristics that are monitored can depend on factors such as the type of mobile game and how users interact with the game, and can include, for example, a player's skill level or rating within the game, number of games won or lost, whether the player is new or experienced, and other like characteristics, which can be stored in and retrieved from, for instance, the player data database 122. At block 206, the processing logic can receive a request from the player to enter a competition or tournament or otherwise engage in interaction in the mobile game, which can initiate the matching process of the present invention. In embodiments, the matching process can be comprised of one or more matching criteria to determine, based on the player's monitored characteristics, which player matching module (also referred to as a "matcher") is most suitable for the player to make the best or most appropriate match for that player. Merely for purposes of illustration and not limitation, FIGS. 2A and 2B illustrate five matching criteria and six player matching modules. However, some implementations of the present invention can support any suitable number of different matching criteria and player matching modules, which can depend on the type of client application, the types of activities for which matching is to be performed, the characteristics of users of the client application, and other like factors.

At block 210, the processing logic can determine whether the player is eligible for a first matching criteria. For example, the first matching criteria can be whether the player is new or experienced. If the processing logic determines that the player is eligible for the first matching criteria (e.g., the player is new), then the processing logic can execute a first player matching module 214. In an embodiment, the first player matching module 214 can be a New Player Matcher. The New Player Matcher can be used to match new players. In an embodiment, the new player matcher can take priority over all or any other matchers, although the matchers can be prioritized in any suitable manner or not prioritized at all. When a new player requests to join a competition or tournament, the New Player Matcher can identify a match with either another new player or a sufficiently low-ranking established player. For example, a player can be considered "new" according to when they first started playing the mobile game or when they first created an account or profile within or otherwise associated with the mobile game. Consequently, an established player who begins playing a new mobile game (e.g., a mobile game that they have not played previously) can be matched by the New Player Matcher. Additionally or alternatively, a player that becomes experienced at competing in one class of competitions in the mobile game (e.g., paid entry competitions) and begins playing in a different class of competitions in the mobile game (e.g., non-paid entry competitions) can be matched by the New Player Matcher for the new class of competitions.

In some embodiments, the first player matching module 214 can be configured by altering one or more parameters that can govern the operation of the module. For example, the New Player Matcher can have a first parameter that determines whether the New Player Matcher is enabled or not (e.g., the matcher can be enabled by default). If the New Player Matcher is disabled, then new players can be matched using the same logic as all other players, even established players. A second parameter can define who is considered a "new" player. For example, a player can be matched by the New Player Matcher if the player has played less than a first predetermined number of games, which can be any suitable number of games. For purposes of illustration and not limitation, if the second parameter is set to 15, then a player can be treated as new for their first 15 competitions or tournaments. Other values for the second parameter are possible. A third parameter can define how many competitions or tournaments a player must have played before being considered an "established" player. For instance, if the third parameter is set to 50, then a player can be considered "established" or "experienced" after playing 50 competitions or tournaments (whether in the present mobile game or as an aggregation of play across multiple other mobile games or competitions). Other values for the third parameter are possible. In an embodiment, using the third parameter, the New Player Matcher can match an established player with a new player if the established player is ranked in a predetermined bottom percentage, such as the bottom 5%, 10%, 15%, or the like of players overall. Other configurations of the first player matching module 214 are possible. For example, the New Player Matcher can be configured such that a player that is completely new to the mobile game (e.g., playing their first competition or tournament) will not be matched with a more experienced player, regardless of the experienced player's rating.

In some embodiments, the first player matching module 214 can also affect or otherwise alter the characteristics of players in any suitable manner. For example, when a new player is matched, the skill rating of the new player can be adjusted based upon the results of the match. Consequently, an established player may neither move up nor down in rating when playing a new player. If two new players are matched against each other, then both players can have their ratings adjusted by be a predetermined percentage of an established amount (e.g., 50% or other suitable percentage). According to an alternative embodiment, such a feature can be part of the kFactor functionality rather than the actual matcher. The kFactor functionality will be discussed in more detail below. New players can have a higher kFactor than established players, such that a new player's rating can be adjusted substantially faster than the rating of an established player. Additionally, for mobile games that have different classes of competitions or tournaments (e.g., paid entry competitions versus non-paid entry competitions), new player ratings can move faster for losses in one class of competition than another class of competition. For example, non-paid entry competitions can have a higher frequency of new players being matched against low-skill established players, and such competitions can also have a larger difference in ratings between new players and low-skilled established players. In an embodiment, appropriate adjustments can be made for paid-entry competitions to limit how much new player and low-skilled establish player ratings can differ. Given that there can be a low win rate of new players against established players, in non-paid entry competitions such matches can occur more often and can be "penalized" more due to the larger difference in ratings. This can lead to faster ratings movement in non-paid entry competition losses as compared to paid-entry competition losses.

At block 210, if the processing logic determines that the player is not eligible for the first matching criteria (e.g., the player is too experienced or established), the processing logic can proceed to block 218. At block 218, the processing logic can determine whether the player is eligible for a second matching criteria. For example, the second matching criteria can be whether the player is eligible for a match against a more or less skilled opponent (e.g., depending upon the player's win or loss rate). If the processing logic determines that the player is eligible for the second matching criteria, then the processing logic can execute the second player matching module 222. In an embodiment, the second player matching module 222 can be a Game Skill Level Matcher. The Game Skill Level Matcher can be used to match a player with an opponent that is either more or less skilled for the player. For example, such matching can occur when the player's win or loss rate is high or otherwise "out of band" and the player is in the midst of an extended winning or losing streak and should be matched with an opponent that can provide a greater or lesser challenge to the player to improve the competitive experience. Thus, the Game Skill Level Matcher can be used when the player's win or loss rate for their previous predetermined number of games (e.g., last 15, 20, or other number of games) is out of band. The Game Skill Level Matcher can search for an opponent with a different skill rating in the appropriate direction based upon whether the player should have a greater or lesser challenge, such as a higher rating if the player needs a more skilled opponent or a lower rating if the player needs a less skilled opponent. According to an embodiment, depending on how extreme the player's win or loss record is and the player's win or loss rate, the player can be matched with an opponent using an ELO difference lower than a predetermined lower bound (e.g., below 50 or the like) or higher than a predetermined upper bound (e.g., higher than 800 or the like).

In some embodiments, the second player matching module 222 can be configured by altering one or more parameters that can govern the operation of the module. For example, if the player is on a winning or losing streak greater than or equal to a first parameter, the Game Skill Level Matcher can attempt to find match with a more or less skilled opponent, as appropriate, to the player. According to a second parameter, the Game Skill Level Matcher would not attempt to identify a match with a more or less skilled opponent if the player has played fewer than a predetermined number of games set by the second parameter. For example, if the second parameter is set to 20, then the Game Skill Level Matcher would not match the player with a more or less skilled opponent if the player has played less than 20 games (e.g., for paid-entry competitions, non-paid-entry competitions, or an appropriate combination thereof). Other values of the second parameter are possible. According to a third parameter, the Game Skill Level Matcher can attempt to achieve a match with a more or less skilled opponent at different levels of difficulty for the player based on a predetermined percentage win or loss rate specified by the third parameter. For purposes of illustration and not limitation, if the third parameter is set to 80%, then the Game Skill Level Matcher can attempt to identify a match with a more skilled opponent if the player has a win rate greater than 80%. Alternatively, if the third parameter is set to 20%, then the Game Skill Level Matcher can attempt to identify a match with a less skilled opponent if the player has a win rate of less than 20%. Other values and associated outcomes for the third parameter are possible.

According to some implementations of the present invention, various suitable techniques can be used by the Game Skill Level Matcher to match a player with a more or less skilled opponent. For example, if a match with a more skilled opponent is desired, the rating of the player's opponent can be given by Equations (1):

$$\text{Opponent Minimum Rating} = \text{Player\_Rating} + \text{Offset} \quad (1)$$

$$\text{Opponent Maximum Rating} = \text{Player\_Rating} + \text{Offset} + (2*\text{Rating\_Band})$$

If a match with a less skilled opponent is desired, the rating of the player's opponent can be given by Equations (2):

$$\text{Opponent Minimum Rating} = \quad (2)$$
$$\text{Player\_Rating} - \text{Offset} - (2*\text{Rating\_Band})$$
$$\text{Opponent Maximum Rating} = \text{Player\_Rating} - \text{Offset}$$

In Equations (2), if the opponent minimum rating is below zero, the result can be shifted up or otherwise increased by an appropriate amount so that the minimum rating is equal to zero. In an embodiment, the Offset in Equations (1) and (2) can be defined based on the desired levels of difficulty discussed previously. For example, if a match with a very high skilled or very low skilled opponent is desired, the Offset can be set to a first value. Alternatively, if a match with a moderately high or moderately low (or neutral) skilled opponent is desired, the Offset can be set to zero. If a match with an opponent between a very high/very low and neutral skill level is desired, then the Offset can be set to a third value that is less than the very high/very low Offset value but greater than zero. In an embodiment, the Rating Band in Equations (1) and (2) can be defined as in Equation (3):

$$\text{Rating Band} = \quad (3)$$
$$\min[((ELO \text{ minimum rating band}) + (ELO \text{ time coefficient} * \text{hours})),$$
$$(ELO \text{ maximum rating band})]$$

where "ELO minimum rating band" can be the minimum amount the Game Skill Level Matcher can search within a rating band above and below the offset for a match, "ELO time coefficient" can be the amount multiplied by a time interval (e.g., minutes, hours) that a competition or tournament has been pending to determine a rating band, and "ELO maximum rating band" can be the maximum amount the Game Skill Level Matcher can search within a rating band above or below the offset for a match. Other values and definitions for the aforementioned parameters are possible.

At block 218, if the processing logic determines that the player is not eligible for the second matching criteria (e.g., the player does not need a match with an opponent who is more or less skilled), the processing logic can proceed to block 226. At block 226, the processing logic can determine whether the player is eligible for a third matching criteria. For example, the third matching criteria can be whether there is a template override for the player. If the processing logic determines that the player is eligible for the third matching criteria, then the processing logic can execute the third player matching module 230. In an embodiment, the third player matching module 230 can be a Template Override Matcher. A template can be a competition or tournament, and template options can be characteristics of the competition or tournament, such as the type of competition (e.g., paid-entry versus non-paid-entry), an amount of a paid-entry competition (e.g., $5, $10, $20, etc.), an amount of a non-paid-entry competition (e.g., 5 virtual tokens, 10 virtual tokens, 20 virtual tokens, etc.), or the like. If there is a template override for the player, the Template Override Matcher can override one or more of the template options associated with the player. In an embodiment, subsequent matching for the player can be performed by the processing logic using the overridden template option(s). According to an alternative embodiment, the Template Override Matcher can override a first template option specified by the player (e.g., a $20 paid-entry competition) with a second template option (e.g., a $10 paid-entry tournament) that facilitates matching when the first template option does not result in a successful match. The second template option can be pre-determined (e.g., a prioritized list of template override options that can be successively tried by the Template Override Matcher to identify a match) or identified by the Template Override Matcher dynamically (e.g., based on the number of players available to match for different template options).

At block 226, if the processing logic determines that the player is not eligible for the third matching criteria (e.g., there is no template override for the player), the processing logic can proceed to block 234 in FIG. 2B. At block 234, the processing logic can randomly select a player matching module to match the player. In an embodiment, the present invention can assign appropriate weights to each or any of the player matching modules to determine which of the modules to randomly choose. For example, some implementations of the present invention can use a map of key-values pairs, where the key can be the name of the player matching module to be used and the value can be the numerator of likelihood that the given player matching module is selected. The denominator can be the sum of all values. Other techniques for randomly selecting a player matching module are possible, such as assigning each player matching module a predetermined number and then generating a random or pseudo-random number (scaled appropriately) to select the player matching module with the predetermined number that is closest to the generated random number. In an embodiment, any of the available player matching modules can be randomly selected by the processing logic at block 234 for use in matching the player. According to an alternative embodiment, any of subset of the available player matching modules can be randomly selected by the processing logic at block 234 for use in matching the player. For example, the subset of available matchers could be the first, second, and third player matching modules 214, 222, and 230, respectively, and the processing logic can randomly select any of those first three player matching modules for use at block 234.

At block 238, the processing logic can determine if a match for the player has been identified using the randomly-selected player matching module from block 234. If the processing logic is unable to determine a match for the player using the randomly-selected player matching module, then the processing logic can proceed to block 242. At block 242, the processing logic can determine whether the player is eligible for a fourth matching criteria. For example, the fourth matching criteria can be whether an appropriate score distribution is enabled for the mobile game. If the processing logic determines that the player is eligible for the fourth matching criteria, then the processing logic can execute the fourth player matching module 244. In an embodiment, the fourth player matching module 244 can be a Feedback Loop Matcher. For example, the Feedback Loop Matcher may not consider player rating when looking for a match. Rather, the Feedback Loop Matcher can operate under the assumption that scores follow a log normal distribution (or other appropriate distribution), which can allow for the calculation of win probabilities based upon player scores. In some embodiments, the fourth player matching module 244 can be configured by altering one or more parameters that can govern the operation of the module. For example, the Feedback Loop Matcher can have a first parameter that specifies the amount of deviation from a predetermined win probability (e.g., 25%, 35%, or other suitable win probability) that the matcher can use when identifying a match for the player. Other values and parameters for use with the Feedback Loop Matcher are possible.

At block 242, if the processing logic determines that the player is not eligible for the fourth matching criteria (e.g., an appropriate score distribution is not enabled), the processing logic can proceed to block 248. At block 248, the processing logic can determine whether the player is eligible for a fifth matching criteria. For example, the fifth matching criteria can be whether player matching with a more or less skilled opponent is enabled. If the processing logic determines that the player is eligible for the fifth matching criteria, then the processing logic can execute the fifth player matching module 252. In an embodiment, the fifth player matching module 252 can be a Lenient Matcher. For example, the Lenient Matcher can be used to more leniently match players in the mobile game. In some embodiments, the Lenient Matcher can be used for established players, where a player can be considered established if they have played more than a predetermined number of games played lifetime (e.g., 20 games, 30 games, etc.) for the type of competition or tournament (e.g., for paid-entry competition or non-paid-entry competition) for which the player is being matched. Any suitable logic can be used to more leniently match players using the Lenient Matcher. For purposes of illustration and not limitation, the Lenient Matcher can allow players in a top predetermined percentage of players (e.g., top 1%, 5%, or the like) in a mobile game to match against any other player in the top predetermined percentage of players in that mobile game. The cutoff for the top predetermined percentage can be calculated by identifying, for example, all players (either for paid-entry competitions or non-paid entry competitions or both) who have been active in a previous time interval (e.g., last 10 days, last 30 days, last 60 days, etc.) and who have played at least a predetermined number of games lifetime (e.g., 20 games, 30 games, etc.). The Lenient Matcher can include a minimum of two players in the top predetermined percentage, although any appropriate minimum number of players can be used. For purposes of illustration and not limitation, the Lenient Match can allow players in a bottom predetermined percentage of players (e.g., bottom 1%, 5%, or the like) in a mobile game to match against any other player in the bottom predetermined percentage of players in that mobile game. The cutoff for the bottom predetermined percentage can be calculated by identifying, for example, all players (either for paid-entry competitions or non-paid entry competitions or both) who have been active in a previous time interval (e.g., last 10 days, last 30 days, last 60 days, etc.) and who have played at least a predetermined number of games lifetime (e.g., 20 games, 30 games, etc.). The Lenient Matcher can include a minimum of two players in the bottom predetermined percentage, although any appropriate minimum number of players can be used. According to an embodiment, if the Lenient Matcher does not identify a match within a predetermined amount of time (e.g., 1 hour, 2 hours, etc.), the Lenient Matcher can match the player with any other player having a same or similar win percentage (e.g., the win percentage of both players can be either greater than 50% or less than or equal to 50%, although any suitable win percentage can be used).

At block 248, if the processing logic determines that the player is not eligible for the fifth matching criteria (e.g., player matching with a more or less skilled opponent is not enabled), then the processing logic can execute the sixth player matching module 256. In an embodiment, the sixth player matching module 256 can be a Rating Matcher. For example, the Rating Matcher can search through all available competitions or tournaments to determine whether any of these competitions/tournaments involve players with skill ratings that are appropriately close enough to the joining player's skill rating. In an embodiment, the longer the matching has been pending, the wider the rating band that can be searched. If one or more appropriate matches have been identified, the Rating Matcher can randomly assign the player to one of the existing competitions/tournaments or assign the player to one of the existing competitions/tournaments having the closest skill rating to the player. In some embodiments, the sixth player matching module 256 can be configured by altering one or more parameters that can govern the operation of the module. For example, the Rating Matcher can have a first parameter that specifies the rating band. The first parameter can be a map of key-value pairs, where the key can be a time interval (e.g., minutes, hours, etc.) and the value can be the eligible rating band to match. For instance, if the time interval is in hours, a key-value pair of 1:80 can match 80 rating difference in the first hour. In an embodiment, the Rating Matcher can use the first parameter to search competitions or tournaments and assess their suitability as a match in the following manner. First, the Rating Matcher can determine the rating band for the competition/tournament based on the last updated timestamp of the competition/tournament. The rating band of the competition/tournament can be based on the key of the key-value pair that is less than the time interval (e.g., number of hours) that have passed since the competition/tournament was last updated. For purposes of illustration and not limitation, the first parameter can have the following key-value pairs: {1:40, 4:60, 8:80, 48:100, 100:120}. If the time interval is in hours, then if a tournament was last updated 2 hours ago, the rating band is 60 based upon the key-values specified in the first parameter. Once the tournament is 4 hours old, the rating band can expand to 80. The Rating Matcher can then compare the rating of the joining player to the rating of the competition/tournament (e.g., based upon the player that created the competition/tournament instance). In an embodiment, if the absolute value of the difference between these two ratings is less than or equal to the rating band, then the player can be matched. Other values and parameters for use with the Rating Matcher are possible.

According to some implementations of the present invention, any suitable number and types of player matching modules can be used in any appropriate order to automatically identify matches for a user of the client application. For example, a Score Matcher can be used additionally or alternatively to any of the player matching modules discussed previously. In an embodiment, the Score Matcher can match two players if the difference between the first player's average score and the second player's normalized average score is within a predetermined percentage (e.g., 1%, 5%, 10%, or the like) of the first player's normalized score (where the first player can be the first to enter the tournament). Additionally or alternatively, a Streak Matcher can be used to match players with similar histories (e.g., two players who have each won or lost 10 games in a row or the like) without regard to any rating. In an embodiment, the Streak Matcher can match two players if the absolute value of the difference between the game streak length of the first player and the game streak length of the second player is less than a predetermined streak threshold (e.g., 2, 3, 4 or the like). Additionally or alternatively, a Win/Loss Rate Matcher can be used for players who are winning or losing at a high rate and should to be matched with more or less challenging opponents to improve the competitive experience. A history of the player's last predetermined number of games (e.g., 10, 15, 20, etc.) can be maintained. If the player has at least a predetermined percentage of wins or losses (e.g., 60%, 80%, etc.) in the last predetermined number of games (and the most recent game played was a win or a loss, as appropriate), then the Win/Loss Rate Matcher can allocate the next matching time to a predetermined time interval (e.g., 1 hour, 4 hours, 6 hours, 8 hours, etc.) into the future, i.e., the minimum time when the earliest a tournament can be matched. Additionally or alternatively, a Bot Matcher can be used for matching a player against a bot. In an embodiment, instead of matching a player against a human, the Bot Matcher can be used to match a player against a bot, which is a software application that is programmed to perform certain tasks, such as playing a mobile game. For example, the player can be matched against a bot when the player is new to a mobile game and first learning how to play the mobile game (e.g., for training or tutorial purposes). Additionally or alternatively, the player can be matched against a bot when no other human matches can be found (e.g., in mobile games with few or no available players in the player pool). Additionally or alternatively, the player can be matched against a bot when the player should be matched against a more or less skilled opponent (e.g., the player is on a winning or losing streak and can be matched with a more or less challenging bot-based opponent, respectively, to improve the competitive experience). Additionally or alternatively, suitable machine learning/artificial intelligence techniques can be used to match players. For example, a machine learning model can be trained based on data from all players in the mobile game. The machine learning model can then be used to dynamically match players for a competition or tournament. The machine learning model can be updated or otherwise adapted as the characteristics of players evolve over time (e.g., changing win/loss ratios and experience levels, preferences for certain games and not others, and the like). According to some implementations of the present invention, the number, types, and order of the matching modules and the criteria used to select each of those modules will depend on, for example, the characteristics of the users and the client application(s) in which matching is taking place. For example, the number, types, and order of the matching modules and the criteria used to select each of those modules can be updated dynamically and automatically by the machine learning model as the characteristics of players evolve over time.

Each of the player matching modules can attempt to match a player with another player according to the criteria and methodology established for the respective player matching module. In an embodiment, the matching performed by each or any of the player matching modules can be limited to a predetermined time interval (e.g., 1 hour, 1 day, etc.) so that matching does not continue indefinitely. According to such an embodiment, if a match is not found within the predetermined time interval, the player can be automatically awarded a win for the competition or tournament. Alternatively, if a match is not found within the predetermined time interval, some implementations of the present invention can select a different matching module (e.g., randomly, such as discussed with respect to block 234 of FIG. 2B, or in a prioritized order) to attempt to identify a match. If the selected matching module does not identify a match, another matching module can be selected (e.g., randomly). Such a process can continue until either a match is found or an appropriate amount of time has elapsed from when the player initially requested to join the competition or tournament (and can be declared the winner, for example).

As discussed previously, some implementations of the present invention can be used in and with any suitable type of client application, such as, for example, an asynchronous or synchronous client application. In an embodiment, the client application can be an asynchronous mobile game. In an asynchronous mobile game, players do not need to play at the same time. For example, in an asynchronous mobile game, a first player can request to join a competition or tournament, which can initiate the player matching techniques of some implementations of the present invention. The first player can play the competition or tournament while some implementations of the present invention search for an appropriate match for the first player. Once a match is found, the identified second player can play the competition or tournament (if not already done so, as the first player may be joining the competition or tournament after the second player). In contrast, in a synchronous mobile game, players are required to play each other at the same time, as the players compete against each other in real-time (e.g., a pool game or the like). Consequently, a synchronous mobile game should not begin until the player matching is completed.

According to some implementations of the present invention, additional or alternative player matching modules can be used for client applications, such as synchronous mobile games, that require matching to be completed—and generally completed more quickly—before the users can interact with each other in the client application. In an embodiment, a FastMatch Matcher can be used for synchronous mobile games. For a FastMatch Matcher, players can enter a FastMatch queue and select one or more template options that each player is interested in playing. The template options can be characteristics of the competition or tournament that the players want to play in the synchronous mobile game, such as the type of competition (e.g., paid-entry versus non-paid-entry), an amount of a paid-entry competition (e.g., $5, $10, $20, etc.), amount of a non-paid-entry competition (e.g., 5 virtual tokens, 10 virtual tokens, 20 virtual tokens, etc.), prize pool, the rules of the competition mode (e.g., $5 8-ball versus $5 trick shot mode in a pool game, etc.) or the like.

The FastMatch Matcher can allow players to enter the queue for multiple templates at once, which can allow for significantly faster matching times. The FastMatch Matcher expansion technique can determine the speed and order that players are entered into the queue (i.e., enqueued) for each template. When a player selects multiple templates, they can be enqueued for each template in decreasing order from, for example, highest value to lowest value (e.g., as determined by the prize, not the entry fee). For instance, the FastMatch Matcher can begin with the highest value paid-entry template, then go down through all paid-entry templates, followed by all of the non-paid-entry templates in descending order. For purposes of illustration and not limitation, a player can select the following templates: a $5 paid-entry competition, a $20 paid-entry competition, a 5 virtual token non-paid-entry competition, and a 20 virtual token non-paid-entry competition, where each of the values can represent prize values (although in an alternative embodiment, the values can represent entry fees). In this example, the player can be enqueued in the following order: the $20 paid-entry competition, then the $5 paid-entry competition, then the 20 virtual token non-paid-entry competition, and then the 5 virtual token non-paid-entry competition. As another example, a player can select templates for two $20 paid-entry competitions but with different competition modes (e.g., one for trick shot and the other for 8-ball in a pool mobile game). In such an embodiment, each competition mode can have an associated priority, which can be used to break "ties" between templates of equal value. In the present illustration for a pool game, a trick shot mode can have a higher priority of, for example, one, while the 8-ball mode can have a lower priority of, for example, two. Other priority values are possible. Consequently, the template with the higher priority (e.g., the trick shot mode with a priority of one) can be enqueued first, the template with the next highest priority (e.g., 8-ball mode with a priority of two) can be enqueued second, and so forth. Such prioritization can also be used to determine the order the competition modes can be displayed on the screen of the client device of the player (e.g., the competition mode with the highest priority can be displayed at the top or first, the competition mode with the next highest priority can be displayed below the top priority or second, etc.). When the player has not been matched for the first template in a certain amount of time, they can then be entered into the queue for the second template (e.g., while still remaining in the queue for the first template), and so on until they are matched.

In an embodiment, the FastMatch Matcher (and/or any of the matchers discussed and described herein) can be based on an actor design pattern. For example, each template can have or otherwise be associated with an actor (e.g., one actor per template). An actor design pattern is a model of concurrent computation that treats actors as the primitive unit of computation. An actor defines some behavior or logic to execute and uses a suitable method of communication to instruct other actors to execute their behavior. The behaviors defined in an actor are asynchronous, so actors do not wait for a response. Rather, actors continue processing and receive a response at some later point in time. All communication is done through message passing, where messages are handled one at a time in the order they are received. In response to a message it receives, an actor can perform an appropriate computation or execute suitable logic, such as make local decisions, create more actors, send more messages, and determine how to respond to the next message received. Actors can modify their own private state, but can only affect each other indirectly through messaging. Actors are isolated from each other and do not share memory—the storage is "Shared-Nothing," meaning the private data is isolated and only accessible by the owning actor. Such properties allow for massive and efficient scaling. For example, actors can support linear scaling to hundreds or thousands of servers without requiring redesign of the architecture. Actors can also support location transparency for case of addressing units of computation both locally and non-locally, so that an actor can reside on any server without requiring redesign of the architecture. Actors can also support lock-free data manipulation, removing the need for lock-based synchronization. Due to the one message at a time rule, there is no need to lock data, so race conditions are prevented. An actor design pattern can be more efficient at handling a large number of users enqueuing and trying to identify matches in a plurality of templates at the same time. Other design patterns for the FastMatch Matcher (and/or any of other matchers discussed and described herein) are possible.

Figure 3:
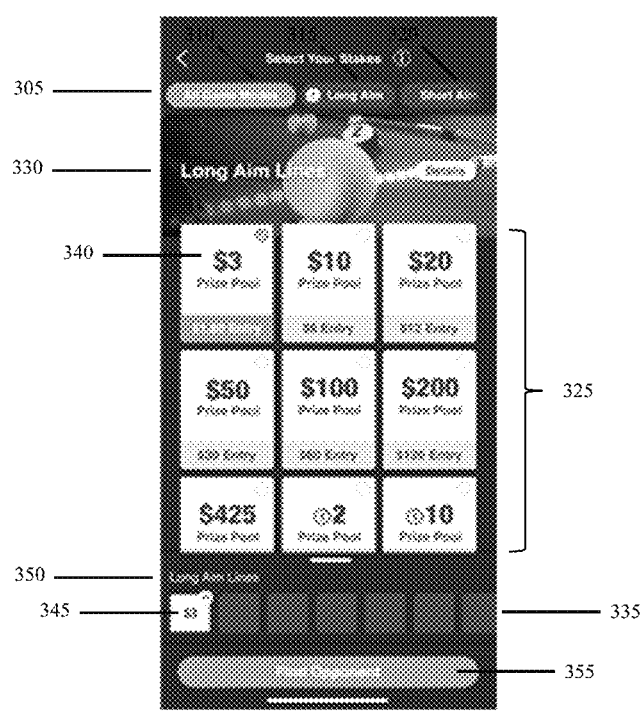
FIG. 3 is an illustration of a first user interface for entering queues for multiple templates with multiple game modes.

FIG. 3 illustrates a first user interface 300 for entering queues for multiple templates with multiple game modes, in accordance with embodiments of the disclosure. Merely for purposes of illustration and not limitation, the user interfaces and associated techniques for entering queues for multiple templates will be discussed in the context of synchronous mobile games. However, such user interfaces and associated techniques can be used for either synchronous or asynchronous mobile games. As illustrated in FIG. 3, a top bar 305 can display a carousel of the available game modes. In an embodiment, the player can select either all game modes or a specific game mode to display the corresponding templates. In an additional embodiment, the player can select a combination of game modes to display the corresponding templates. The type and number of available game modes will depend on, for example, the synchronous mobile game being played by the player. The carousel of top bar 305 can scroll horizontally, for example, when there are more available game modes than can be displayed within the first user interface 300. For example, in a synchronous pool mobile game, the top bar 305 can include an all game modes 310, a long aim lines mode 315, a short aim lines mode 320, and other like game modes. The top bar 305 can default to, for example, the all game modes 310 or other suitable game mode. In an embodiment, selecting a game mode from the top bar 305 can filter out the other game modes from the top bar 305.

According to embodiments, the first user interface 300 can include a plurality of templates 325 for each game mode, which can be comprised of paid-entry templates, non-paid-entry templates, or a mixture of both. Other templates are possible. In an embodiment, the available templates can be grouped by, for example, game mode. According to an embodiment, each game mode can be used as a FastMatch set in which to identify opponent matches. In other words, the FastMatch Matcher can use the templates selected by the player for a particular game mode to identify opponent matches for that game mode. For purposes of illustration and not limitation, a player who has selected one or more templates in the long aim lines mode 315 can be matched by the FastMatch Matcher against an opponent who selected one or more corresponding templates in the long aim lines mode 315. A FastMatch set can be comprised of all of the templates within or otherwise associated with a game mode (e.g., as determined by the tournament parameters defining rules of the game mode). In an alternative embodiment, a FastMatch set can be comprised of templates of different game modes (e.g., each template in a set can list the game mode in addition to prize pool, entry fee, and the like). When grouped by game mode, the plurality of templates 325 can be identified by a game mode name 330 displayed in a banner above or near the plurality of templates 325. In the exemplary illustration of FIG. 3, the plurality of templates 325 for long aim lines mode 315 can include at least seven paid-entry templates (which can vary based on prize pool and entry fee) and two non-paid-entry templates (which can vary based on the prize pool). The player can access additional templates for the game mode (if they exist) by scrolling, for example, vertically. Other templates, combinations of templates, and any suitable number of templates for each game mode are possible. The plurality of templates 325 can be ordered in any appropriate manner, such as by priority, by prize pool or entry fee (either ascending, descending, or random order), or the like. In an embodiment, the plurality of templates 325 can be ordered in ascending order of paid-entry competition prize value then by ascending order of non-paid entry competition prize value, etc.

According to embodiments, the first user interface 300 can include a first bottom bar 335 for displaying a carousel of the template selections. The template selections can be displayed in the same order as previously discussed for the plurality of templates 325. In an alternative embodiment, the template selections can be displayed in the order chosen by the player for the given game mode or even randomly. The name 350 of the game mode for which templates are being selected (e.g., long aim lines mode 315) can be displayed above or near the first bottom bar 335. If a player first selects a first template 340, the first template 340 can be displayed in a first open position 345 in the first bottom bar 335 (e.g., the leftmost position). As the player makes additional template selections, those template selections can be placed in the next consecutive open position in the first bottom bar 335. Thus, the player can create a prioritized list of templates in which the player desires to participate, with the highest priority template on one end (e.g., the leftmost position in the first bottom bar 335) and templates of successively lesser priority listed consecutively afterwards. Once the player has selected the desired template(s) from the plurality of templates 325 for the given game mode, the player can press the "Find Opponent" button 355 to be matched by the FastMatch Matcher with an opponent in the manner described herein.

Figure 4:
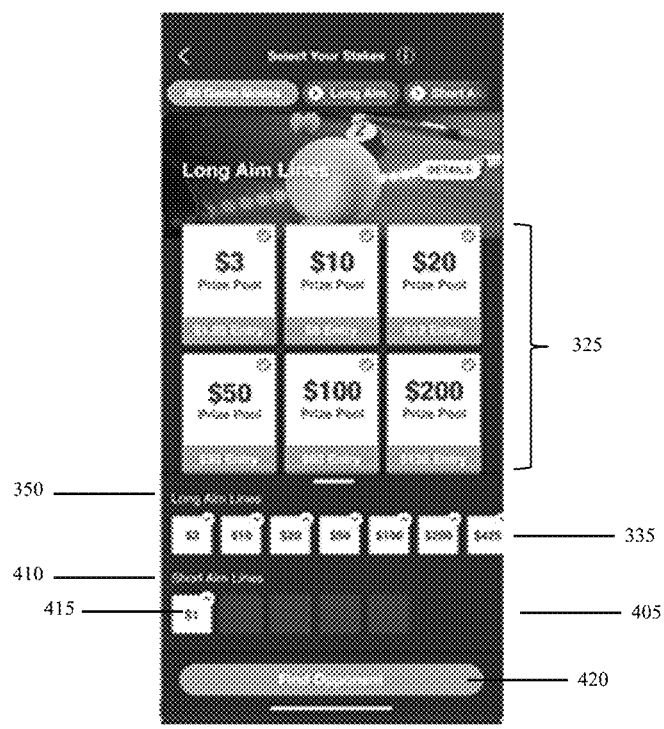
FIG. 4 is an illustration of a second user interface for entering queues for multiple templates with multiple game modes.

Since there can be multiple game modes supported by the first user interface 300, the player can scroll (e.g., vertically or, in an alternative embodiment, horizontally) to view the remaining game modes and the corresponding templates for selection. To select templates from different game modes, additional bottom bars can be included as separate rows for each game mode. FIG. 4 illustrates a second user interface 400 for entering queues for multiple templates with multiple game modes, in accordance with embodiments of the disclosure. The second user interface 400 can include features similar to those discussed with respect to the first user interface 300 in FIG. 3. However, FIG. 4 can include a second bottom bar 405 corresponding to a second game mode (e.g., short aim lines mode 320). In embodiments, the user interface can have a minimum of one bottom bar (e.g., first bottom bar 335 in first user interfaces 300 and 400). Additional bottom bars can be separate bars or extensions of the first bottom bar 335 (e.g., a wraparound). The carousel of template selections can be displayed in the same order as previously discussed for the plurality of templates 325. In an alternative embodiment, the template selections can be displayed in the order chosen by the player for the second game mode or even randomly. The name 410 of the second game mode for which templates are being selected (e.g., short aim lines mode 320) can be displayed above or near the second bottom bar 405. If a player first selects a first template for the second game mode, the first template can be displayed in a first open position 415 in the second bottom bar 405 (e.g., the leftmost position). As the player makes additional template selections for the second game mode, those template selections can be placed in the next consecutive open position in the second bottom bar 405. Thus, a prioritized list of templates can be created and displayed in which the player desires to participate for the second game mode, with the highest priority template on one end (e.g., the leftmost position in the second bottom bar 405) and templates of successively lesser priority listed consecutively afterwards. In an embodiment, such prioritization can be created and managed by the server system 114 (e.g., by a system administrator or the like). In alternative embodiment, the player can create the prioritized list of templates. Any suitable number of bottom bars can be used to display template selections for each game mode, depending on the number of game modes being displayed and supported. In this manner, both the game modes and the templates can be prioritized within each game mode for finding a match (e.g., by a system administrator of server system 114 or by the player). In an embodiment, the player can open either bottom bar to display all selected game modes or minimize either or both bottom bars so that, for example, the top game mode is displayed while the remaining game modes are hidden.

According to an embodiment, once the player presses the "Find Opponent" button 420, the FastMatch Matcher can begin by analyzing the collection of all selected templates and progressing through the templates in, for example, descending order of paid-entry competition prize values followed by the descending order of the non-paid-entry competition prize values, regardless of game mode. If there is a tie in the prize value between two competition modes with selected templates, then the higher priority template (e.g., template with priority 1, then template with priority 2, then template with priority 3, etc.) can be queued first. For purposes of illustration and not limitation, the following templates can be selected by a player for a pool game: $20 8-ball (competition mode priority 1); $20 trick shot (competition mode priority 2); $5 8-ball (competition mode priority 1); $5 trick shot (competition mode priority 2); 1 virtual token trick shot (game competition priority 1). The order of queuing to find a match can be as follows: $20 8-ball; $20 trick shot; $5 8-ball; $5 trick shot; and 1 virtual token trick shot. In an alternative embodiment, the Fast-Match Matcher can begin with the highest priority template in the first bottom row 335 and progress through the list of templates in that row to find an appropriate match. If no matches are identified in the first bottom row 335, the FastMatch matcher can proceed to the second bottom bar 405. The FastMatch Matcher can attempt to identify a match starting with the highest priority template in the second bottom bar 405 and progress through the list of templates in that row to find an appropriate match. The FastMatch Matcher can proceed through each row for each game mode until an appropriate match is found. In either embodiment, the player can remain in the queue for one or more previous templates while being enqueued for one or more additional templates to maximize the ability of the FastMatch Matcher to identify a match. Other ways to traverse the templates by the FastMatch Matcher to identify matches are possible.

In an embodiment, if the FastMatch Matcher is unable to identify a match based on the selected templates, the FastMatch Matcher can prompt the player to play one or more different templates, such as alternative synchronous mobile game templates and/or asynchronous mobile game templates. The FastMatch Matcher can display or cause to be displayed a suitable notification in the user interface to the player to prompt the player if they want to match in the different (other) template. For example, such a prompt can occur when the FastMatch Matcher identifies no matches for the player with their selected templates (e.g., no identified matches in a predetermined amount of time), but identifies a second player with a different selected template (in the same game, but either in the same or a different game mode). In an embodiment, the FastMatch Matcher can be configured for allowable fallbacks to prevent certain fallbacks from being offered to one or more players (e.g., no bot template fallbacks, no asynchronous fallbacks for synchronous templates and vice versa, and the like). Additionally or alternatively, the FastMatch Matcher can prompt the player to add templates to their selection to increase the chances of a successful match (e.g., by adding popular templates or templates with higher player liquidity).

In an embodiment, the FastMatch Matcher can dynamically add or remove templates from the plurality of templates 325 when various player liquidity thresholds are met. For example, a player can be provided with a first set of the plurality of templates 325, such as the set of templates illustrated in FIG. 3 or FIG. 4. The FastMatch Matcher can obtain and maintain in real-time the number of players available to match for each template, the average wait time to match, match success rates, total queues, and other like information to determine player liquidity in real-time. Each template can have an associated player liquidity threshold associated with it. For purposes of illustration and not limitation, the player liquidity threshold can indicate, for example, the minimum number of players that the FastMatch Matcher needs to generate a successful match for that template, although the player liquidity threshold can be based on other suitable factors or a combination of factors (e.g., available players, average wait time, etc.). The player liquidity threshold can be the same between or vary among the templates. For example, a template with a smaller entry fee (e.g., $1.80) may have a higher player liquidity threshold, since more players may generally be available and have a lower average wait time for matching in tournaments with smaller entry fees. However, a template with a larger entry fee (e.g., $120) may have a lower player liquidity threshold, because fewer players may generally be available and have a longer average wait time for matching in tournaments with larger entry fees. In a set of templates, the FastMatch Matcher can remove a template from the set displayed or otherwise presented to the player when the player liquidity falls below the player liquidity threshold for that template. The FastMatch Matcher can add a template to the set displayed or otherwise presented to the player when the player liquidity rises above the player liquidity threshold for that template. With such dynamic template scaling, the player can be presented (continuously or at predetermined intervals) with an updated set of templates that can maximize the chances of a successful match. Additionally or alternatively, each template can be associated with one or more times or time ranges, so that the FastMatch Matcher can add to or remove from each set certain templates for the player at predetermined times or within the predetermined time ranges.

In an embodiment, the FastMatch Matcher can dynamically modify the player matching for each or any templates based on player liquidity thresholds. For example, as player liquidity increases above a predetermined threshold (or is within a predetermined threshold range), the FastMatch Matcher can provide tighter matching for each or any templates, since there may be more players available for matching. Conversely, as player liquidity decreases below the predetermined threshold (or is outside the predetermined threshold range), the FastMatch Matcher can provide wider matching for each or any templates, since there may be fewer players available for matching. For example, the FastMatch Matcher can provide tighter or wider matching by suitably updating the parameters that are used on the ELO expansion so that it can take more or less time to expand to a wider or tighter maximum range of ELO difference between two players where the FastMatch Matcher would allow them to match to one another. In such a manner, the FastMatch Matcher can respond to player liquidity in real-time to maximize the probability of successfully matching players. Additionally or alternatively, the FastMatch Matcher can dynamically modify the player matching for each or any templates based on the time of day or other suitable parameters, such that the FastMatch Matcher can modify player matching at predetermined times or within the predetermined time ranges. Additionally or alternatively, a suitable machine learning/artificial intelligence techniques can be used by the FastMatch Matcher to match players. For example, a machine learning model can be trained based on player liquidity data for each or any templates to optimize, for example, the time to successful match. The machine learning model can then be used to dynamically match players for each or any of the templates. The machine learning model can be updated or otherwise adapted as player liquidity changes over time.

In an embodiment, to improve or otherwise boost player liquidity for one or more templates, the FastMatch Matcher can display or cause to be displayed in the user interface a suitable modal to prompt players to play certain synchronous mobile games or certain game modes in those synchronous mobile games. Additionally or alternatively, the FastMatch Matcher can display or cause to be displayed a chat message in a chat user interface to prompt players to play certain synchronous mobile games or certain game modes in those synchronous mobile games. Such prompts can be displayed automatically by the FastMatch Matcher when player liquidity levels (either generally for the game or for one or more templates) fall below suitable player liquidity thresholds. The player prompts can continue until a player liquidity level (e.g., user liquidity level) is greater than or equal to a user liquidity threshold (e.g., user liquidity threshold) or the player liquidity levels (e.g., user liquidity levels) are greater than or equal to the player liquidity thresholds (e.g., user liquidity thresholds), for a predetermined time interval, or the like. Additionally or alternatively, the FastMatch Matcher can display or cause to be displayed such prompts at predetermined times or within predetermined time ranges.

Figure 5:
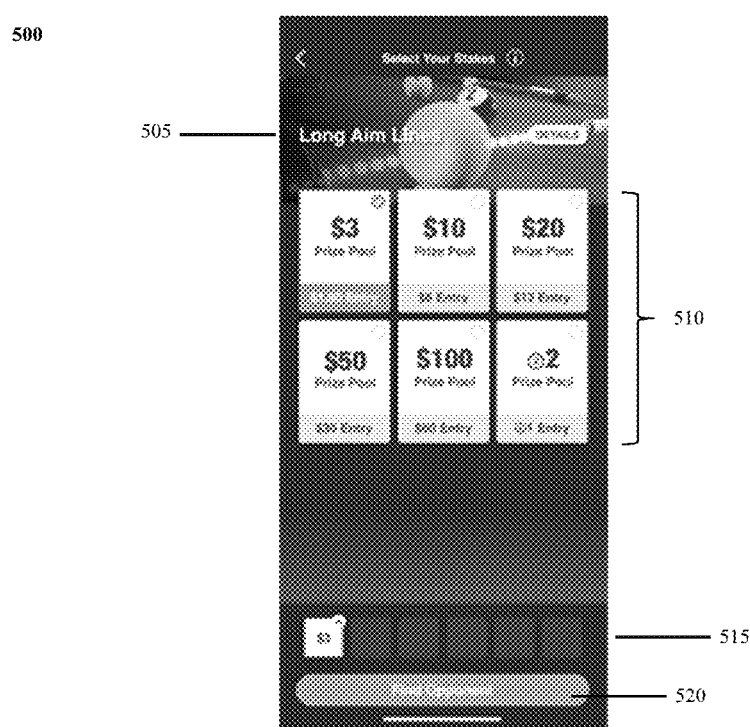
FIG. 5 is an illustration of a third user interface for entering queues for multiple templates with a single game mode.

FIG. 5 illustrates a third user interface 500 for entering queues for multiple templates with a single game mode, in accordance with embodiments of the disclosure. In an embodiment where multiple game modes are not available, the third user interface 500 can display a single game mode (e.g., long aim lines mode 505). The third user interface 500 can include features similar to those discussed with respect to the first user interface 300 in FIG. 3 and the second user interface 400 in FIG. 4. However, because a single game mode is available, the third user interface 500 does not include a top bar, although such a feature can be included if desired. The player can vertically scroll through a plurality of templates 510 (if such templates cannot all fit on the screen) associated with the single game mode. The third user interface 500 can include a bottom bar 515 that can operate in a manner similar to the first bottom bar 335 illustrated in FIG. 3. The third user interface 500 would not support multiple (i.e., second or more) bottom bars, because the third user interface 500 displays a single game mode in such an embodiment. In an embodiment, the bottom bar 515 of the third user interface 500 cannot be minimized or hidden, because there is only one game mode being offered. A name for the game mode can be displayed above or near the bottom bar 515, but can be removed from the display if desired. Once the player has selected the desired template(s) from the plurality of templates 510 for the single game mode, the player can press the "Find Opponent" button 520 to be matched by the FastMatch Matcher with an opponent in the manner described herein.

The speed at which the player is enqueued into each template can be determined by a suitable expansion technique. In one embodiment, the FastMatch Matcher expansion technique can be a linear algorithm, such as in Equation (4):

$$Y = mX + b \qquad (4)$$

In Equation (4), the variable Y can be the total time since entering the first queue, the variable X can be the expansion index starting from 0, the constant b can be a first time interval (e.g., in seconds) for how long the FastMatch Matcher waits before entering the second selected template, and the constant m can be a second time interval (e.g., in seconds) for how long the FastMatch Matcher waits before moving from the second selected template to the third selected template, from the third selected template to the fourth selected template, and so forth.

According to embodiments, the variable X can represent how many additional queues have been entered since the first queue. When X=0, the player is in one queue and waits Y(0) until entering the next queue. When X=1, the player is in two total queues and waits Y(1) time to enter the third queue. Y(1)–Y(0) time passes between entering the second and third queues. For purposes of illustration and not limitation with m=1 and b=1 (i.e., Y=x+1), a player can select the templates discussed above. For purposes of illustration and not limitation, a player can select the following templates: a $5 paid-entry competition, a $20 paid-entry competition, a 5 virtual token non-paid-entry competition, and a 20 virtual token non-paid-entry competition. In this example, the player can be enqueued in the following order: the $20 paid-entry competition, then the $5 paid-entry competition, then the 20 virtual token non-paid-entry competition, and then the 5 virtual token non-paid-entry competition. Using Equation (4) for the FastMatch Matcher, the player immediately enters a queue for the $20 paid-entry competition. After one second (Y=1*0+1=1), the player enters a queue for the $5 paid-entry competition. After an additional one second (two seconds total, i.e., Y=1*1+1=2), the player enters a queue for the 20 virtual token non-paid-entry competition. After an additional one second (three seconds total, i.e., Y=1*2+1=3), the player enters a queue for the 5 virtual token non-paid entry competition. According to an alternative embodiment, both m and b can be set to zero to allow the player to enter all queues simultaneously.

In another embodiment, the FastMatch Matcher expansion technique can be a logarithmic algorithm, such as Equation (5):

$$Y = \ln(mX + b) + c \qquad (5)$$

In Equation (5), the definitions of the variables and parameters are similar to those discussed with respect to Equation (4), where the constant c can be a third time interval (e.g., in seconds) to control how fast the logarithmic algorithm expands to subsequent templates. Thus, the logarithmic algorithm of Equation (5) can expand slowly to the second template and then quickly expand to all other templates. For purposes of illustration and not limitation, let m=1, b=1, and c=5 (i.e., Y=ln(X+1)+5) and a player selects the templates discussed above. The player is immediately queued into the first template. The player is enqueued for the second template after Y=ln(1*0+1)+5=5 seconds. The user then enters the third queue after Y=ln(1*1+1)+5=~5.7 seconds. The user enters the fourth queue after Y=ln(2*1+1)+5=~6.1 seconds.

In another embodiment, the Fast Matcher expansion technique can be an exponential algorithm, such as in Equation (6):

$$Y = e \wedge (mX + b) + c \qquad (6)$$

In Equation (6), the definitions of the variables and parameters are similar to those discussed with respect to Equation (5). Thus, the exponential algorithm can expand quickly to the second and then slowly to all other templates. For purposes of illustration and not limitation, let m=1, b=1, and c=5 (i.e., Y=e^(X+1)+5) and a player selects the templates discussed above. The player is immediately queued into the first template. The player is enqueued for the second template after Y=^(1*0+1)+5=~7.7 seconds. The user then enters the third queue after Y=e^(1*1+1)+5=~12.4 seconds. The user enters the fourth queue after Y=e^(2*1+1)+5=~25.1 seconds.

In some embodiments, the constants m, b, and c can be customizable and can differ between each expansion technique. The expansion techniques can be set, for example, on a per-game basis, on a per-template-group basis, specific to an individual template ID, at an entry type level (e.g., paid-entry or non-paid-entry), or the like. For example, one expansion technique can be used for a first mobile game, while another expansion technique can be used for a second mobile game, and so on. According to an embodiment, different expansion techniques can be applied by the FastMatch Matcher configuration for a mobile game at different times of the day. For example, the linear expansion algorithm can be used from 6 am to 6 pm, the logarithmic expansion algorithm can be used from 6 pm to 12 am, and the exponential algorithm can be used from 12 am to 6 am. Other expansion techniques in other orders and times are possible. Additionally or alternatively, the variables and parameters for each of the expansion techniques can be modified based on, for example, the time of day. For example, the FastMatch Matcher can modify the variables and parameters to provide tighter matching during peak hours, while FastMatch Matcher can modify the variables and parameters to provide wider matching during off-hours.

According to an embodiment, an ELO Rating Matcher can be used for synchronous mobile games. Additionally or alternatively, the ELO Rating Matcher can be used for asynchronous mobile games. The ELO Rating Matcher expansion technique can determine how quickly a player's possible rating band for matching expands. In an embodiment, the ELO Rating Matcher can use an exponential rating expansion algorithm, such as in Equation (7):

$$Y = \min(a + b * e \wedge (X/c), d) \quad (7)$$

In Equation (7), the variable Y is the rating difference, the variable X is how long to wait before matching, constant a is the minimum rating for instant matching, constants b and c are scaling coefficients, and constant d is the maximum rating difference. In an embodiment, the values of a, b, c, and d can be adjusted based on, for example, a template or template type (e.g., paid-entry competitions versus non-paid-entry competitions) basis. In an embodiment, the ELO Rating Matcher can be used for event-based expansion. For example, when a player enters a queue, the ELO Rating Matcher can loop through all players in the queue and schedule messages to match in a predetermined number of seconds based on the rating difference. If a player has already been matched with another player by the time their message is processed, then further matching is not necessary. In such an embodiment, because matching is event-based, when a player enters the queue, the matching performed by the ELO Rating Matcher should be reciprocal in rating difference. For purposes of illustration and not limitation, let a first player have an ELO of 1200. The first player requests a synchronous competition and enters a queue. Waiting in the queue are the following three players: a second player having an ELO of 400; a third player having an ELO of 1400; and a fourth player having an ELO of 1500. In the present illustration, let a=200, b=2, c=2, and d=800 for Equation (7). Therefore, the ELO Rating Matcher can immediately match the first player with any player below a 200 rating difference, which would expand to 800 points over 10 seconds (and can be capped at 800 if d=800, otherwise d would need to be modified). In the present illustration, the ELO Rating Matcher can immediately match the first player with the third player, because their rating difference is 200 and a=200, while it would take the ELO Rating Matcher approximately 7 seconds to match the first player with the fourth player (with a rating difference of 300), and approximately 12 seconds to match the first player with the second player (with a rating difference of 800).

In an embodiment, the ELO Rating Matcher can dynamically adjust the expansion algorithm parameters. For example, the expansion algorithm parameters can be dynamically adjusted based on real-time player liquidity. A predetermined player liquidity threshold can be used by the ELO Rating Matcher to determine when the expansion algorithm parameters can be adjusted. For example, when player liquidity is below the predetermined player liquidity threshold, the ELO Rating Matcher can adjust the expansion algorithm parameters to provide wider matching (e.g., by increasing the maximum rating difference), since there may be fewer players available for matching. Alternatively, when the player liquidity is above the predetermined player liquidity threshold, the ELO Rating Matcher can adjust the expansion algorithm parameters to provide tighter matching (e.g., by decreasing the maximum rating difference), since there may be more players available for matching. Additionally or alternatively, the ELO Rating Matcher can modify the expansion algorithm parameters based on, for example, the time of day. For example, the ELO Rating Matcher can modify the expansion algorithm parameters to provide tighter matching during peak hours, while the ELO Rating Matcher can modify the expansion algorithm parameters to provide wider matching during off-hours.

Additionally or alternatively, the ELO Rating Matcher can adjust the expansion algorithm parameters so that ELO ratings can expand asymmetrically. In such an embodiment, the ELO Rating Matcher can use different upwards and downwards ELO expansions to expand more quickly in one direction than the other. Accordingly, the ELO Rating Matcher can use different expansion algorithm parameters for upward and downward expansion. For purposes of illustration and not limitation, downward expansion algorithm parameters can provide for faster expansion than the upward expansion algorithm parameters. In the present illustration, a first available opponent can be 100 ELO below a player, while a second available opponent can be 75 ELO above the player. In the present illustration, a match with the first available opponent can be made by the ELO Rating Matcher due to asymmetric expansion since the downward expansion is faster, even though the first available opponent is further away from the player. Such asymmetric matching can be bucket-based, such that players can be matched with opponents in the same bucket or group of players. If no matches are found within the bucket within a predetermined amount of time, the ELO Rating Matcher can expand matching to opponents in different buckets.

According to an embodiment, the FastMatch Matcher and the ELO Rating Matcher can be used in conjunction to perform matching in, for example, synchronous mobile games and other like client applications, although the FastMatch Matcher and the ELO Rating Matcher can be used for asynchronous mobile games and other like client applications. As discussed previously, the FastMatch Matcher can allow players to enter the queue for multiple templates at once. When a player selects multiple templates, they can be enqueued for each template in, for example, decreasing order. As the player enters each queue, a respective ELO Rating Matcher can be used to match that player with other players waiting in the respective queue. For purposes of illustration and not limitation, a player can be enqueued by the FastMatch Matcher in the following order: a $20 paid-entry competition, then a $5 paid-entry competition, then a 20 virtual token non-paid-entry competition, and then a 5 virtual token non-paid-entry competition. The player would immediately enter the queue for the $20 paid-entry competition, which initiates the ELO Rating Matcher for a $20 paid-entry competition. After one second (e.g., using the linear algorithm of Equation (4) with m=1 and b=1), the player enters a queue for the $5 paid-entry competition, which initiates the ELO Rating Matcher for a $5 paid-entry competition. After an additional one second (2 seconds total), the player enters a queue for the 20 virtual token non-paid-entry competition, which initiates the ELO Rating Matcher for a 20 virtual token competition. After an additional one second (three seconds total), the player enters a queue for the 5 virtual token non-paid entry competition, which initiates the ELO Rating Matcher for a 5 virtual token competition. However, either or both of the FastMatch Matcher and the ELO Rating Matcher can be used individually, collectively, or in any combination with any or all of the player matching modules discussed previously to achieve a preferred matching in the shortest time possible.

According to an embodiment, to assist in matching with either or both of the FastMatch Matcher and ELO Rating Matcher, players can be classified into groups or "buckets" based on any suitable characteristics of those players, such as skill rating, the total number of games played, the total number of games won, the number of synchronous games played, the number of synchronous games won, the number of asynchronous games played, the number of asynchronous games won, and the like, or any combination thereof. Other player characteristics are possible. For example, players who are "new" and have played less than a predetermined number of games can be classified into a first bucket. Other "experienced" players can be classified into buckets according to, for example, their skill rating for the mobile game, where each bucket can have a corresponding skill band. Additionally or alternatively, experienced players can be classified into buckets according to the number of games played (e.g., total, for synchronous games, for asynchronous games, etc.), the number of games won (e.g., total, for synchronous games, for asynchronous games, etc.), where each bucket can have a corresponding number of games played, number of games won, etc. or any combination thereof. Other characteristics for buckets are possible. Any suitable number of such buckets can be used and each bucket can be associated with any appropriate characteristic of the client application. Additionally or alternatively, each bucket can be associated with an ELO expansion algorithm. According to an embodiment of the present invention, players can be matched with players in the same bucket. However, for some player matching modules, players in a bucket associated with a first characteristic can be matched with players in another bucket associated with a second characteristic if, for example, the second characteristic is within a predetermined difference or range of the first characteristic. Additionally or alternatively, matching within a player's bucket can continue for a predetermined amount of time before matching expands to other player buckets. In other words, in intra-bucket matching, the matching population for a player can be limited to the player's bucket for a first predetermined amount time (e.g., seconds). If the player is not matched within that amount of time, the matching can be expanded to include players from other buckets (i.e., inter-bucket matching), such as, for example, those who have expanded past their respective time windows. Additionally or alternatively, different variables and parameters used for the various expansion techniques can be assigned to or otherwise associated with each bucket, and each set of variables and parameters can be appropriately modified by the matcher, such as dynamically (e.g., based on real-time player liquidity), based on the time of day, or the like.

Users of the client applications, such as players in mobile games, can be rated or otherwise characterized or categorized in any suitable manner. In an embodiment, a new player can begin with a first predetermined rating level. Ratings can be calculated and adjusted for all players once a competition or tournament concludes. For example, the ratings for each player can be calculated using various suitable factors (as discussed below), then the rating of the winner can be calculated, and then the rating of the loser(s) can be calculated. Each player's new rating can then be saved to their associated game account or online profile. In an embodiment, if the actual outcome of a tournament was determined by the processing logic as being highly likely (based upon player ratings), the participating players may see a minimal change in rating. However, if the processing logic determines an unlikely outcome, such as a low-rated player beating a high-rated player, the result can be a larger change in rating.

According to an embodiment of the present invention, when a competition or tournament concludes, a preliminary rating change for a player can be calculated based upon, for example, the result of the match (win, loss, or draw) and the difference in rating between the player and their closest opponent. Such a preliminary change (e.g., a value between −1 and 1) can then be multiplied by the "kFactor" to determine the actual change in rating. A kFactor for a given match can depend upon various appropriate parameters. In an embodiment, the parameters related to the kFactor can be the same for each game and can be based on suitable game-related behavior. For example, a player who has played a first predetermined number (e.g., 5, 10, 15, or the like) or fewer games can have a first kFactor (e.g., 100, 110, 120, or the like). A player who has played a second predetermined number (e.g., 20, 25, 30 or the like) or fewer games can have a second kFactor of (e.g., 50, 60, 70, or the like). A player with a rating greater than a third predetermined number (e.g., 1600, 1700, 1800 or the like) can have a third kFactor (e.g., 10, 20, 30, or the like). A player with a rating greater than fourth predetermined number (e.g., 1300, 1400, 1500, or the like) can have a fourth kFactor (e.g., 5, 10, 15, or the like). All other players can have a fifth kFactor (e.g., 20, 25, 30, or the like). Other types and values of the kFactor are possible. In some embodiments, if an established player is matched against a new player (e.g., the new player has played less than a certain number of games), the kFactor for the established player can be set to zero. If a first new player is matched against a second new player, the kFactor for the first new player can be reduced by a predetermined amount (e.g., 50%, 60%, or the like), which can also reduce the kFactor for the second new player by a corresponding amount. For games in which there are three or more players, the calculation can proceed as follows. First, players can be sorted by score then by rating. The winner (e.g., first place player) can be treated as having won a match against the highest rated opponent. The loser (e.g., last place player) can be treated as having lost to the player directly above them. All other players (e.g., in the middle) can be treated as having won against the player immediately below them and lost to the player immediately above them. In an embodiment, if there is a draw in any of the matches, then such a result can be taken into account instead of the wins/losses discussed previously. Other techniques for calculating or otherwise determining player rating levels are possible.

In an alternative embodiment, any or all of the predetermined values discussed above can be determined dynamically. According to the alternative embodiment, the processing logic and any or all of the first player matching module 116, the second player matching module 118, . . . , the $N^{th}$ player matching module 120 can use suitable machine learning/artificial intelligence techniques to dynamically choose or otherwise select the appropriate values for any or all of the predetermined values and/or parameters discussed above. For example, one or more machine learning models can be trained based on data from either or both of the player data database 120 and game data database 122. The one or more machine learning models can then be used to dynamically select the appropriate values for each or any of the aforementioned variables based on, for example, characteristics of the players (e.g., skill level/rating, wins, losses, scores, times, etc.), characteristics of the mobile game (e.g., the type of game or competition), and other like characteristics or data. The one or more machine learning models can be updated or otherwise adapted as the characteristics, results, and other like data associated with the players and mobile games evolve over time.

FIG. 6 is a block diagram illustrating an example computer-implemented method 600 of automatically determining an appropriate match for a user of a client application based on a plurality of interaction templates selected by the user. The method 600 can begin at block 605, a request can be received, from a first user of a plurality of users of an application client executing on respective mobile devices of the plurality of users, to interact with one or more other users of the plurality of users in the application client based on a first plurality of interaction templates selected by the user. At block 610, a second user of the plurality of users can be determined. The second user can be associated with a second interaction template, and the determination of the second user can be based on an identification of a match between the second interaction template and a first interaction template from the first plurality of interaction templates. At block 615, an interaction between the first user and the second user can be initiated in the application client in response to the determination of the second user.

According to some implementations of the present invention, systems and/or methods for switchback testing may be used in conjunction with the player matching functionality described herein to allow for testing of the functionality while also accounting for the bias of pre-post measurement. In some implementations, the switchback testing methodology can alternate between a test treatment and a control treatment for one or more of the player matching techniques described herein, including, for example, the FastMatch Matcher and the ELO Rating Matcher described above, and the alternation can occur in accordance with a predetermined switchback testing protocol. In some implementations, the test treatment and control treatment can be applied to one or more configuration parameters of the player matching techniques, including game algorithms, currency algorithms, template algorithms, and bucket-level algorithms. In some implementations, the predetermined switchback testing protocol can be a randomized protocol.

For purposes of illustration and not limitation, for example, the predetermined protocol can specify that the one or more of the player matching techniques described above are to be utilized on a first day, then not utilized on the following second day, and then utilized again on the following third day, and continuing to alternate back and forth, between utilization and non-utilization each day, for a number of days specified by the testing protocol. The results of the player matching on days when the one or more player matching techniques are utilized can be compared to the results of the player matching on days when the one or more player matching techniques are not utilized and thereby provide a measure of the effectiveness of the one or more player matching techniques. Although the present illustration describes alternating days, embodiments of the present invention can alternate using any suitable time period, such as, for example, minutes, hours, days, weeks, etc. By employing this switchback testing methodology, optimizations made to the player matching techniques described herein can be tested more effectively.

Figure 7:
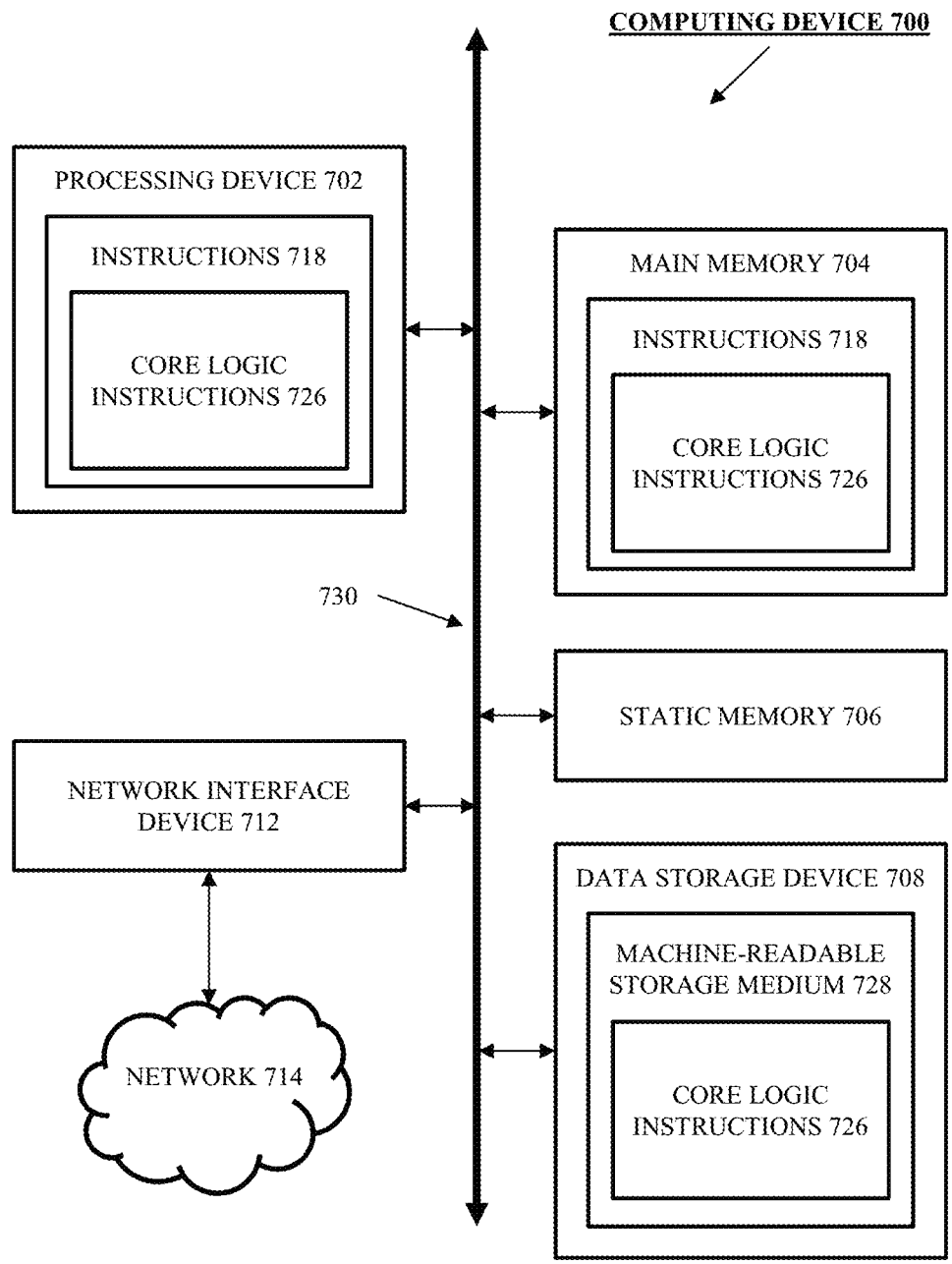
FIG. 7 is a block diagram of an example computing device that may perform one or more of the operations described herein, in accordance with the present embodiments.

FIG. 7 is a block diagram of an example computing device 700 that may perform one or more of the operations described herein, in accordance with the present embodiments. The computing device 700 may be connected to other computing devices in a LAN, an intranet, an extranet, and/or the Internet. The computing device 700 may operate in the capacity of a server machine in client-server network environment or in the capacity of a client in a peer-to-peer network environment. The computing device 700 may be provided by a personal computer (PC), a set-top box (STB), a server, a network router, switch or bridge, or any machine capable of executing a set of instructions (sequential or otherwise) that specify actions to be taken by that machine. Further, while only a single computing device 700 is illustrated, the term "computing device" shall also be taken to include any collection of computing devices that individually or jointly execute a set (or multiple sets) of instructions to perform the methods discussed herein.

The example computing device 700 may include a computer processing device 602 (e.g., a general purpose processor, ASIC, etc.), a main memory 704, a static memory 706 (e.g., flash memory or the like), and a data storage device 708, which may communicate with each other via a bus 730. The computer processing device 702 may be provided by one or more general-purpose processing devices such as a microprocessor, central processing unit, or the like. In an illustrative example, computer processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The computer processing device 702 may also comprise one or more special-purpose processing devices, such as an application specific integrated circuit (ASIC), a field programmable gate array (FPGA), a digital signal processor (DSP), network processor, or the like. The computer processing device 702 may be configured to execute the operations described herein, in accordance with one or more aspects of the present disclosure, for performing the operations and steps discussed herein.

The computing device 700 may further include a network interface device 712, which may communicate with a network 714. The data storage device 708 may include a machine-readable storage medium 728 on which may be stored one or more sets of instructions, e.g., instructions for carrying out the operations described herein, in accordance with one or more aspects of the present disclosure. Instructions 718 implementing core logic instructions 726 may also reside, completely or at least partially, within main memory 704 and/or within computer processing device 702 during execution thereof by the computing device 700, main memory 704 and computer processing device 702 also constituting computer-readable media. The instructions may further be transmitted or received over the network 714 via the network interface device 612.

While machine-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, magnetic media, and the like.

The subject matter described herein provides many technical advantages. For example, some implementations of the present invention can improve the efficiency and processing capabilities of computer hardware resources (e.g., computer processing and memory) to identify matches by supporting and providing substantially faster matching times, particularly for client applications with large numbers of users (e.g., hundreds of thousands, millions, tens of millions, etc. of users). For example, some implementations of the present invention can more efficiently handle large numbers of users enqueuing and identifying matches in a plurality of templates at the same time. By improving the matching speed and efficiency for client applications with large numbers of users, computer hardware resources can be freed up more quickly and used for other tasks and processes, resulting in a significant improvement in computer resource utilization.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor (at least one programmable processor), a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, solid state drives, or the like. However, a computer need not have such devices. Moreover, a computer can be embedded in another device, e.g., a smart phone, a mobile audio or media player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or the like, for displaying information to the user and a keyboard and a pointing device, e.g., a mouse, a trackball, a touchpad, a stylus, or the like, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), peer-to-peer networks (e.g., ad hoc peer-to-peer networks), and the like.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Reference throughout this disclosure to "one embodiment" or "an embodiment" means that a particular feature, structure, or characteristic described in connection with the embodiments included in at least one embodiment. Thus, the appearances of the phrase "in one embodiment" or "in an embodiment" in various places throughout this disclosure are not necessarily all referring to the same embodiment. In addition, the term "or" is intended to mean an inclusive "or" rather than an exclusive "or."

While this disclosure contains many specific implementation details, these should not be construed as limitations on the scope of any inventions or of what may be claimed, but rather as descriptions of features specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above description of illustrated implementations of the invention is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   receiving, by at least one data processor, a request from a first user of a client application to initiate an electronic interaction session with a second user based on a first plurality of interaction templates selected by the first user in the client application, wherein each of the first plurality of interaction templates is associated with a respective priority;
   enqueuing, by the at least one data processor, one of the first plurality of interaction templates according to the respective priority associated with each of the first plurality of interaction templates of the client application;
   determining, by the at least one data processor, a match between the one of the first plurality of interaction templates and one of a second plurality of interaction templates selected by the second user in the client application; and
   providing, by the at least one data processor, the electronic interaction session in the client application between the first user and the second user based on a matched interaction template.

2. The method of claim 1, wherein the client application executes on respective client devices of the second user;
   the matching performed according to the respective priority associated with each of the first plurality of interaction templates;
   the first plurality of interaction templates selected by the first user from a set of available interaction templates; and
   the set of available interaction templates is determined based on a characteristic of the first user.

3. The method of claim 1, wherein:
   the request to initiate the electronic interaction session with the second user is based on a selection of the first plurality of interaction templates in the client application;
   the one of the first plurality of interaction templates remains enqueued while one or more additional interaction templates of the first plurality of interaction templates are enqueued until the match is determined; and
   the determining of the match between the one of the first plurality of interaction templates and one of the second plurality of interaction templates is based on at least one of a first matching characteristic and a second matching characteristic.

4. The method of claim 3, wherein:
   a rate at which each of the one or more additional interaction templates of the first plurality of interaction templates is enqueued is based on an interaction template expansion rate; and
   the first matching characteristic corresponds to a skill level and the second matching characteristic corresponds to an experience level.

5. The method of claim 4, wherein the interaction template expansion rate is one of linear, logarithmic, or exponential.

6. The method of claim 1, further comprising:
   determining, by the at least one data processor, the match between the one of the first plurality of interaction templates and one of a third plurality of interaction templates selected by a third user of a plurality of users in the client application when a length of time for determining the match with the one of the second plurality of interaction templates selected by the second user exceeds a predetermined threshold.

7. The method of claim 1, wherein each interaction template of the first plurality of interaction templates is associated with a respective user liquidity threshold for matching, the method further comprising:
   removing, by the at least one data processor, one or more interaction templates from the first plurality of interaction templates when a respective user liquidity level associated with the one or more interaction templates is less than the respective user liquidity threshold for matching, the respective user liquidity level corresponds to a threshold number of players for inclusion in association with the one or more interaction templates.

8. The method of claim 1, further comprising:
   grouping, by the at least one data processor, the first user with a subset of users of a plurality of users into a first cohort of a plurality of cohorts based on one or more shared characteristics between the first user and the subset of users, wherein the determining is performed between the first user and the subset of users within the first cohort.

9. The method of claim 1, wherein the first plurality of interaction templates is displayed to the first user in the client application in prioritized order after selection.

10. The method of claim 1, wherein the client application is a synchronous competitive skill-based digital game.

11. A system, comprising:
    at least one data processor; and
    memory storing instructions that, when executed by the at least one data processor, cause the at least one data processor to perform operations comprising:
    receiving a request from a first user of a client application to initiate an electronic interaction session with a second user based on a first plurality of interaction templates selected by the first user in the client application, wherein each of the first plurality of interaction templates is associated with a respective priority;
    enqueuing one of the first plurality of interaction templates according to the respective priority associated with each of the first plurality of interaction templates of the client application;
    determining a match between the one of the first plurality of interaction templates and one of a second plurality of interaction templates selected by the second user in the client application; and
    providing the electronic interaction session in the client application between the first user and the second user based on a matched interaction template.

12. The system of claim 11, wherein:
the client application executes on respective client devices of the second user;
the matching performed according to the respective priority associated with each of the first plurality of interaction templates; and
the first plurality of interaction templates is selected by the first user from a set of available interaction templates; and
the set of available interaction templates is determined based on a characteristic of the first user.

13. The system of claim 11, wherein:
the request to initiate the electronic interaction session with the second user is based on a selection of the first plurality of interaction templates in the client application; and
the one of the first plurality of interaction templates remains enqueued while one or more additional interaction templates of the first plurality of interaction templates are enqueued until the match is determined; and
the determining of the match between the one of the first plurality of interaction templates and one of the second plurality of interaction templates is based on at least one of a first matching characteristic and a second matching characteristic.

14. The system of claim 13, wherein:
a rate at which each of the one or more additional interaction templates of the first plurality of interaction templates is enqueued is based on an interaction template expansion rate; and
the first matching characteristic corresponds to a skill level and the second matching characteristic corresponds to an experience level.

15. The system of claim 14, wherein the interaction template expansion rate includes one of linear, logarithmic, or exponential.

16. The system of claim 11, wherein the operations further comprise:
determining the match between the one of the first plurality of interaction templates and one of a third plurality of interaction templates selected by a third user of a plurality of users in the client application when a length of time for determining the match with the one of the second plurality of interaction templates selected by the second user exceeds a predetermined threshold.

17. The system of claim 11, wherein each interaction template of the first plurality of interaction templates is associated with a respective user liquidity threshold for matching, and wherein the operations further comprise:
removing one or more interaction templates from the first plurality of interaction templates when a respective user liquidity level associated with the one or more interaction templates is less than the respective user liquidity threshold for matching the respective user liquidity level corresponds to a threshold number of players for inclusion in association with the one or more interaction templates.

18. The system of claim 11, further comprising:
grouping the first user with a subset of users of a plurality of users into a first cohort of a plurality of cohorts based on one or more shared characteristics between the first user and the subset of users, wherein the determining is performed between the first user and the subset of users within the first cohort.

19. The system of claim 11, wherein the first plurality of interaction templates is displayed to the first user in the client application in prioritized order after selection.

20. A non-transitory machine readable medium storing instructions that, when executed by at least one programmable processor, cause the at least one programmable processor to perform operations comprising:
receiving a request from a first user of a plurality of users of a client application to initiate an electronic interaction session with a second user based on a first plurality of interaction templates selected by the first user in the client application, wherein each of the first plurality of interaction templates is associated with a respective priority;
enqueuing one of the first plurality of interaction templates according to the respective priority associated with each of the first plurality of interaction templates of the client application;
determining a match between the one of the first plurality of interaction templates and one of a second plurality of interaction templates selected by the second user in the client application; and
providing the electronic interaction session in the client application between the first user and the second user based on a matched interaction template.

* * * * *